United States Patent
Yamashita

(10) Patent No.: US 8,643,212 B2
(45) Date of Patent: Feb. 4, 2014

(54) POWER SUPPLY APPARATUS FOR VEHICLE AND METHOD OF CONTROLLING POWER SUPPLY APPARATUS FOR VEHICLE

(75) Inventor: Masaharu Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 568 days.

(21) Appl. No.: 12/991,775

(22) PCT Filed: Apr. 3, 2009

(86) PCT No.: PCT/IB2009/005175
§ 371 (c)(1),
(2), (4) Date: Nov. 9, 2010

(87) PCT Pub. No.: WO2009/138831
PCT Pub. Date: Nov. 19, 2009

(65) Prior Publication Data
US 2011/0057510 A1    Mar. 10, 2011

(30) Foreign Application Priority Data

May 14, 2008   (JP) .................................. 2008-126737

(51) Int. Cl.
*B60L 1/00*      (2006.01)
(52) U.S. Cl.
USPC ......................................................... 307/9.1
(58) Field of Classification Search
USPC ......................................................... 307/9.1
See application file for complete search history.

(56) References Cited

U.S. PATENT DOCUMENTS

| 6,066,928 | A | 5/2000 | Kinoshita et al. | |
|---|---|---|---|---|
| 2008/0156138 | A1* | 7/2008 | Tomaru et al. | 74/493 |
| 2010/0044146 | A1* | 2/2010 | Kasai et al. | 180/446 |
| 2010/0164287 | A1* | 7/2010 | Komazawa et al. | 307/44 |

FOREIGN PATENT DOCUMENTS

| DE | 100 42 524 A1 | 3/2002 |
|---|---|---|
| DE | 103 42 178 A1 | 4/2005 |
| DE | 103 54 103 | 6/2005 |
| DE | 10 2005 029 081 A1 | 1/2007 |
| DE | 10 2005 029 836 | 1/2007 |
| DE | 10 2007 026 164 A1 | 12/2008 |
| EP | 1 676 738 | 7/2006 |
| JP | 63 242772 | 10/1988 |
| JP | 7 76280 | 3/1995 |
| JP | 7 245808 | 9/1995 |

(Continued)

OTHER PUBLICATIONS

Machine translation of EP 1676738 A2; Zillmer et al, Jul. 2006.*

(Continued)

*Primary Examiner* — Jared Fureman
*Assistant Examiner* — Duc M Pham
(74) *Attorney, Agent, or Firm* — Oblon, Spivak, McClelland, Maier & Neustadt, L.L.P.

(57) ABSTRACT

A subsidiary power supply, which is an electric power storage device, is connected in parallel to a circuit that connects a main power supply to a motor drive circuit. A power supply control portion controls a boosted voltage of a voltage-boosting circuit so that an actual amount of charge in the subsidiary power supply is equal to a target amount of charge. The target amount of charge is set to increase as deceleration of a vehicle increases.

5 Claims, 11 Drawing Sheets

(56) References Cited

FOREIGN PATENT DOCUMENTS

| JP | 2004 260903 | | 9/2004 |
|---|---|---|---|
| JP | 2007-189788 | * | 1/2006 |
| JP | 2006 191795 | | 7/2006 |
| JP | 2007 091122 | | 4/2007 |
| WO | WO 2006/136380 A1 | | 12/2006 |

OTHER PUBLICATIONS

Office Action issued Nov. 15, 2012 in German Application No. 11 2009 001 196.9 (With English Translation).
International Search Report issued Jul. 15, 2009 in PCT/IB09/05175 filed Apr. 3, 2009.
Office Action issued Apr. 23, 2010, in Japanese Patent Application No. 2008-126737, filed May 14, 2008, (with English language translation).

* cited by examiner

POWER SUPPLY APPARATUS FOR VEHICLE AND METHOD OF CONTROLLING POWER SUPPLY APPARATUS FOR VEHICLE

BACKGROUND OF THE INVENTION

1. Field of the Invention

The invention relates to a power supply apparatus for a vehicle, which includes a main power supply that supplies electric power to a plurality of vehicle-mounted electric loads, and a subsidiary power supply charged with the electric power output from the main power supply, and a method of controlling the power supply apparatus.

2. Description of the Related Art

For example, an electric power steering apparatus generally includes an electric motor that provides steering assist torque to the turning operation of a steering wheel. The steering assist torque is adjusted by controlling the feeding of electric power to the electric motor. Such an electric power steering apparatus uses a vehicle-mounted power supply (a battery and a power generator) as a power source, and consumes large electric power. Therefore, for example, an apparatus proposed in Japanese Patent Application Publication No. 2007-91122 (JP-A-2007-91122) includes a subsidiary power supply that assists the vehicle-mounted power supply. The subsidiary power supply is connected in parallel to a power supply line that extends from the vehicle-mounted power supply (hereinafter, referred to as "main power supply") to a motor drive circuit. The subsidiary power supply is charged with the electric power output from the main power supply. The subsidiary power supply supplies the electric power to the motor drive circuit using the electric power with which the subsidiary power supply is charged.

The apparatus proposed in the publication No. 2007-91122 includes a power-feeding switch that allows and prohibits the feeding of electric power from the subsidiary power supply to the motor drive circuit. When target electric power used to operate the electric motor is larger than a predetermined value, the power-feeding switch is turned on to form a power supply circuit that supplies the electric power from the subsidiary power supply to the motor drive circuit. Also, the apparatus includes a charging switch that allows and prohibits charging of the subsidiary power supply with the electric power output from the main power supply. When it is determined that the subsidiary power supply is not in a full-charge state based on a voltage between both terminals of the subsidiary power supply, the charging switch is turned on to charge the subsidiary power supply with the electric power output from the main power supply.

In the apparatus proposed in the publication No. 2007-91122, the subsidiary power supply is charged when the voltage between the both terminals of the subsidiary power supply is lower than the reference voltage. That is, the subsidiary power supply is charged simply based on the voltage between the both terminals of the subsidiary power supply. Therefore, an effective charging control according to the traveling state of a vehicle is not executed.

SUMMARY OF THE INVENTION

The invention provides a power supply apparatus for a vehicle and a method of controlling the power supply apparatus, in which a subsidiary power supply is effectively charged according to a travel state of a vehicle.

A first aspect of the invention relates to a power supply apparatus for a vehicle. The power supply apparatus includes a main power supply that includes a power generator driven by an engine to generate electric power, and a battery, wherein the power generator and the battery are connected in parallel to each other; a subsidiary power supply that is connected in parallel to a circuit that connects the main power supply to a specific electric load, wherein the subsidiary power supply is charged with the electric power output from the main power supply, and the subsidiary power supply assists supply of the electric power to the specific electric load using the electric power with which the subsidiary power supply is charged; a charge amount control portion that controls charging of the subsidiary power supply so that an amount of charge in the subsidiary power supply is equal to a target amount of charge; a decelerating-state detection portion that detects a decelerating state of a vehicle; and a target charge amount setting portion that sets the target amount of charge based on the decelerating state of the vehicle detected by the decelerating-state detection portion so that when the vehicle is decelerating, the target amount of charge is larger than the target amount of charge when the vehicle is not decelerating.

In the first aspect, the subsidiary power supply is connected in parallel to the circuit that connects the main power supply to the specific electric load. Therefore, the electric power output from the main power supply is supplied to the specific electric load and the subsidiary power supply. The subsidiary power supply is charged with the electric power supplied from the main power supply, and the subsidiary power supply assists the supply of the electric power to the specific electric load using the electric power with which the subsidiary power supply is charged. The charge amount control portion controls the charging of the subsidiary power supply so that the amount of charge in the subsidiary power supply is equal to the target amount of charge.

When the vehicle is decelerating, kinetic energy in the vehicle is usually consumed by a brake. In this situation, there is excess kinetic energy. Accordingly, in the first aspect, the decelerating-state detection portion and the target charge amount setting portion are provided. The excess kinetic energy is actively recovered, and the recovered energy is used to charge the subsidiary power supply.

The decelerating-state detection portion detects the decelerating state of the vehicle (i.e., the state of the vehicle in which a vehicle speed decreases). For example, the decelerating-state detection portion may include a vehicle-speed detection portion, and the decelerating-state detection portion may calculate the deceleration based on the vehicle speed. Also, the decelerating-state detection portion may include a brake detection portion that detects a brake operation, and the decelerating-state detection portion may detect the decelerating state of the vehicle based on the brake operation. Also, the decelerating-state detection portion may include a brake pressure detection portion that detects a brake pressure, and the decelerating-state detection portion may detect the decelerating state of the vehicle based on the brake pressure. Also, the decelerating-state detection portion may include an acceleration detection portion that detects the longitudinal acceleration of the vehicle, and the decelerating-state detection portion may detect the decelerating state of the vehicle based on the longitudinal acceleration of the vehicle.

The target charge amount setting portion sets the target amount of charge in the subsidiary power supply so that when the vehicle is decelerating, the target amount of charge is larger than the target amount of charge when the vehicle is not decelerating. Accordingly, when the vehicle is decelerating, the charge amount control portion controls the charging of the subsidiary power supply based on the target amount of charge that is increased. Therefore, the excess kinetic energy is effectively used to charge the subsidiary power supply via the power generator. As a result, the subsidiary power supply is efficiently charged. This increases the ability of the subsidiary power supply to supply the electric power to the specific electric load.

The decelerating-state detection portion may detect the degree of deceleration of the vehicle, and the target amount of charge may be set to increase as the degree of the deceleration of the vehicle increases. Also, for example, the charge amount control portion may include a charge amount detection portion that detects the amount of charge in the subsidiary power supply, and the charging may be controlled so that the detected amount of charge is equal to the target amount of charge.

In the first aspect, the power supply apparatus may further include a charge current limiting portion that limits a charge current that flows to the subsidiary power supply to a value equal to or smaller than an upper limit value; and an upper limit current setting portion that sets the upper limit value based on the decelerating state of the vehicle detected by the decelerating-state detection portion so that when the vehicle is decelerating, the upper limit value is larger than the upper limit value when the vehicle is not decelerating.

In the configuration, the charge current limiting portion limits the charge current that flows to the subsidiary power supply to a value equal to or smaller than the upper limit value. Thus, the charge current limiting portion reduces the possibility that excess current flows between the main power supply and the subsidiary power supply, thereby protecting the power supply apparatus. The upper limit current setting portion sets the upper limit value of the charge current so that when the vehicle is decelerating, the upper limit value of the charge current is larger than the upper limit value when the vehicle is not decelerating. Accordingly, when the vehicle is decelerating, both of the target amount of charge and the upper limit value of the charge current are set to be larger than those when the vehicle is not decelerating. Therefore, it is possible to efficiently charge the subsidiary power supply in a short time period. The decelerating-state detection portion may detect the degree of deceleration of the vehicle, and the upper limit value of the charge current may be set to increase as the degree of the deceleration of the vehicle increases.

In the first aspect, the specific electric load may be an electric actuator of an electric power steering apparatus, which generates steering assist torque that assists a steering operation performed by a driver.

In the configuration, the specific electric load is the electric actuator of the electric power steering apparatus, which generates the steering assist torque that assists the steering operation performed by the driver. In the electric power steering apparatus, because large steering assist torque needs to be generated, the electric power consumed by the electric actuator is large. Accordingly, in the configuration, when large electric power is consumed by the electric actuator, the subsidiary power supply assists the supply of the electric power.

The steering assist performance is adversely affected by a decrease in the amount of charge in the subsidiary power supply. However, in the configuration, when the vehicle is decelerating, the excess kinetic energy is effectively used to charge the subsidiary power supply via the power generator. As a result, it is possible to maintain the ability of the subsidiary power supply to supply the electric power at a high level, and therefore, to maintain the good steering assist performance.

The power supply apparatus may further include a vehicle-speed detection portion that detects a vehicle speed. The target charge amount setting portion may set the target amount of charge so that when the detected vehicle speed is high, the target amount of charge is smaller than the target amount of charge when the detected vehicle speed is low, and when the vehicle is decelerating, the target amount of charge is larger than the target amount of charge when the vehicle is not decelerating.

In the configuration, the target amount of charge is set based on the decelerating state of the vehicle and the vehicle speed. In the electric power steering apparatus, when the vehicle travels at a high speed, large steering assist torque is not required, and the electric power consumed by the electric actuator is small. Accordingly, when the vehicle travels at a high speed, the required amount of charge in the subsidiary power supply is smaller than that when the vehicle travels at a low speed. Thus, in the configuration, when the vehicle speed is high, the target amount of charge is set to be smaller than that when the vehicle speed is low. Therefore, the amount of charge in the subsidiary power supply is an appropriate amount. Thus, it is possible to increase the lifetime of the subsidiary power supply, while maintaining the good steering assist performance. Also, when the vehicle is decelerating, the target amount of charge is set to be larger than that when the vehicle is not decelerating. Therefore, the excess kinetic energy is effectively used to charge the subsidiary power supply via the power generator. Thus, it is possible to quickly charge the subsidiary power supply so that the electric power is supplied from the subsidiary power supply when large electric power is consumed thereafter due to the steering operation performed while the vehicle is stopped or the vehicle travels at a low speed.

The power supply apparatus may further include a voltage-boosting circuit that boosts an output voltage of the main power supply. A power supply circuit that supplies the electric power from the voltage-boosting circuit to the specific electric load may be formed, and the subsidiary power supply may be connected in parallel to the power supply circuit. The charge amount control portion may control the charging of the subsidiary power supply by controlling a boosted voltage of the voltage-boosting circuit.

In the configuration, the output voltage of the main power supply is boosted by the voltage-boosting circuit, and the electric power whose voltage is boosted is supplied to the specific electric load and the subsidiary power supply. In this case, the subsidiary power supply is charged with the electric power when the boosted voltage of the voltage-boosting circuit is higher than the output voltage of the subsidiary power supply.

The power supply that supplies the electric power to the specific electric load is naturally changed according to balance between the boosted voltage of the voltage-boosting circuit and the output voltage of the subsidiary power supply (power supply voltage) (i.e., according to the magnitude relation between the voltages). That is, when the boosted voltage of the voltage-boosting circuit is higher than the output voltage of the subsidiary power supply, the output from the voltage-boosting circuit is supplied to the specific electric load. When the boosted voltage of the voltage-boosting circuit is lower than the output voltage of the subsidiary power supply, the output from the subsidiary power supply is supplied to the specific electric load. Accordingly, it is possible to easily control the charging and discharging of the subsidiary power supply by controlling the boosted voltage of the voltage-boosting circuit. Using his, the charge amount control portion controls the boosted voltage of the voltage-boosting circuit so that the amount of charge in the subsidiary power supply is equal to the target amount of charge.

A second aspect of the invention relates to a power supply apparatus for a vehicle. The power supply apparatus includes a main power supply that includes a power generator driven by an engine to generate electric power, and a battery, wherein the power generator and the battery are connected in parallel to each other; a subsidiary power supply that is connected in parallel to a circuit that connects the main power supply to a specific electric load, wherein the subsidiary power supply is charged with the electric power output from the main power supply, and the subsidiary power supply assists supply of the electric power to the specific electric load using the electric power with which the subisidary power supply is charged; a charge current limiting portion that limits a charge current that flows to the subisidary power supply to a value equal to or smaller than an upper limit value; a decelerating-state detection portion that detects a decelerating state of a vehicle; and an upper limit current setting portion that sets the upper limit value based on the decelerating state of the vehicle detected by the decelerating-state detection portion so that when the vehicle is decelerating, the upper limit value is larger than the upper limit value when the vehicle is not decelerating.

In the second aspect, the charge current limiting portion limits the charge current that flows to the subsidiary power supply to a value equal to or smaller the upper limit value. Thus, the charge current limiting portion reduces the possibility that excess current flows between the main power supply and the subsidiary power supply, thereby protecting the power supply apparatus. The upper limit current setting portion sets the upper limit of the charge current so that when the vehicle is decelerating, the upper limit of the charge current is larger than the upper limit of the charge current when the vehicle is not decelerating. Thus, it is possible to charge the subsidiary power supply in a short time period. As a result, the excess kinetic energy is effectively used when the vehicle is decelerating.

In the second aspect, the power supply apparatus may further include a voltage-boosting circuit that boosts an output voltage of the main power supply. A power supply circuit that supplies the electric power from the voltage-boosting circuit to the specific electric load may be formed, and the subsidiary power supply may be connected in parallel to the power supply circuit. The charge current limiting portion may limit the charge current that flows to the subsidiary power supply by controlling a boosted voltage of the voltage-boosting circuit.

In the configuration, it is possible to adjust the difference between the boosted voltage of the subsidiary power supply and the output voltage, by controlling the boosted voltage of the voltage-boosting circuit. Accordingly, the charge current limiting portion easily limits the charge current that flows to the subsidiary power supply, by controlling the boosted voltage of the voltage-boosting circuit.

A third aspect of the invention relates to a method of controlling a power supply apparatus for a vehicle. The power supply apparatus includes a main power supply that includes a power generator driven by an engine to generate electric power, and a battery, wherein the power generator and the battery are connected in parallel to each other; and a subsidiary power supply that is connected in parallel to a circuit that connects the main power supply to a specific electric load, wherein the subsidiary power supply is charged with the electric power output from the main power supply, and the subsidiary power supply assists supply of the electric power to the specific electric load using the electric power with which the subsidiary power supply is charged. The method includes controlling charging of the subsidiary power supply so that an amount of charge in the subsidiary power supply is equal to a target amount of charge; detecting a decelerating state of a vehicle; and setting the target amount of charge based on the detected decelerating state of the vehicle so that when the vehicle is decelerating, the target amount of charge is larger than the target amount of charge when the vehicle is not decelerating.

A fourth aspect of the invention relates to a method of controlling a power supply apparatus for a vehicle. The power supply apparatus including a main power supply that includes a power generator driven by an engine to generate electric power, and a battery, wherein the power generator and the battery are connected in parallel to each other; and a subsidiary power supply that is connected in parallel to a circuit that connects the main power supply to a specific electric load, wherein the subsidiary power supply is charged with the electric power output from the main power supply, and the subsidiary power supply assists supply of the electric power to the specific electric load using the electric power with which the subsidiary power supply is charged. The method includes limiting a charge current that flows to the subsidiary power supply to a value equal to or smaller than an upper limit value; detecting a decelerating state of a vehicle; and setting the upper limit value based on the detected decelerating state of the vehicle so that when the vehicle is decelerating, the upper limit value is larger than the upper limit value when the vehicle is not decelerating.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
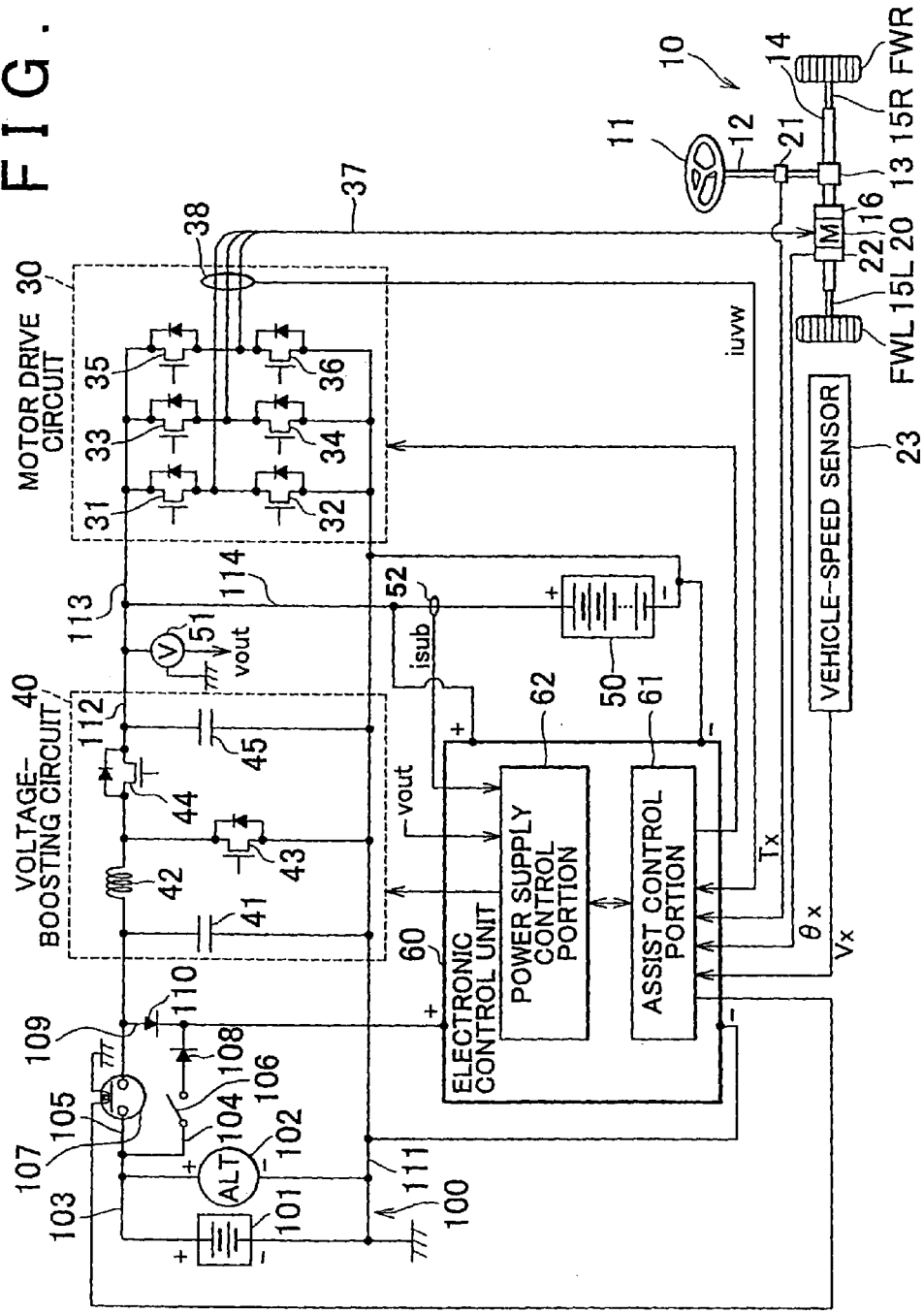
FIG. 1 is a schematic configuration diagram showing an electric power steering apparatus that includes a power supply apparatus according to an embodiment of the invention.

Hereinafter, a power supply apparatus for a vehicle according to an embodiment of the invention will be described with reference to the drawings. FIG. 1 shows a schematic configuration of an electric power steering apparatus that includes a power supply apparatus for a vehicle according to the embodiment.

The electric power steering apparatus includes a steering mechanism 10, an electric motor 20, a motor drive circuit 30, a voltage-boosting circuit 40, a subsidiary power supply 50, and an electronic control unit 60. The steering mechanism 10 steers steered wheels according to the steering operation of a steering wheel 11. The electric motor 20, fitted to the steering mechanism 10, generates steering assist torque that assists the steering operation. The motor drive circuit 30 drives the electric motor 20. The voltage-boosting circuit 40 boosts an output voltage of a main power supply 100, and supplies the boosted voltage to the motor drive circuit 30. The subsidiary power supply 50 is connected in parallel to a power supply circuit between the voltage-boosting circuit 40 and the motor drive circuit 30. The electronic control unit 60 controls the operation of the electric motor 20 and the operation of the voltage-boosting circuit 40.

The steering mechanism 10 steers right and left front wheels FWR and FWL according to the turning operation of the steering wheel 11. The steering mechanism 10 includes a steering shaft 12. The upper end of the steering shaft 12 is connected to the steering wheel 11 in a manner such that the steering shaft 12 rotates integrally with the steering wheel 11. The lower end of the steering shaft 12 is connected to a pinion gear 13 in a manner such that the pinion gear 13 rotates integrally with the steering shaft 12. The pinion gear 13 engages with rack teeth formed on a rack bar 14. The pinion gear 13 and the rack bar 14 constitute a rack and pinion mechanism. Knuckles (not shown) of the right and left front wheels FWR and FWL are connected to ends of the rack bar 14 via tie rods 15R and 15L. The right and left front wheels FWR and FWL are steered to the right or left according to the displacement of the rack bar 14 in the axial direction of the rack bar 14. The rack bar 14 is displaced in the axial direction of the rack bar 14 according to the rotation of the steering shaft 12 around the axis of the steering shaft 12.

The electric motor 20, which assists the steering operation, is fitted to the rack bar 14. The rotational shaft of the electric motor 20 is connected to the rack bar 14 via a ball screw mechanism 16 so that power is transmitted from the electric motor 20 to the rack bar 14. When the electric motor 20 rotates, the electric motor 20 provides a steering force to the right and left front wheels FWR and FWL to assist the steering operation. The ball screw mechanism 16 functions as a speed reducer, and a rotation-straight movement converter. That is, the ball screw mechanism 16 reduces the speed of the rotation transmitted from the electric motor 20, converts the rotation to straight movement, and transmits the straight movement to the rack bar 14.

A steering torque sensor 21 is provided in the steering shaft 12. The steering torque sensor 21 outputs a signal corresponding to steering torque that is applied to the steering shaft 12 according to the turning operation of the steering wheel 11. Hereinafter, the value of the steering torque, which is detected based on the signal output from the steering torque sensor 21, will be referred to as "steering torque Tx". The direction in which the steering wheel is turned is determined based on whether the steering torque Tx is a positive value or a negative value. In the embodiment, the steering torque Tx when the steering wheel 11 is turned in a clockwise direction is indicated by a positive value. The steering torque Tx when the steering wheel 11 is turned in a counterclockwise direction is indicated by a negative value. Thus, the magnitude of the steering torque Tx is indicated by the magnitude of the absolute value of the steering torque Tx.

A rotational angle sensor 22 is provided in the electric motor 20. The rotational angle sensor 22 is incorporated in the electric motor 20. The rotational angle sensor 22 outputs a detection signal corresponding to the rotational angle position of a rotor of the electric motor 20. The detection signal output from the rotational angle sensor 22 is used for calculations of the rotational angle and rotational angular velocity of the electric motor 20. Because the rotational angle of the electric motor 20 is proportional to the steering angle of the steering wheel 11, the rotational angle of the electric motor 20 is also used as the steering angle of the steering wheel 11. The rotational angular velocity of the electric motor 20, which is obtained by differentiating the rotational angle of the electric motor 20 with respect to time, is proportional to the steering angular velocity of the steering wheel 11. Therefore, the rotational angular velocity of the electric motor 20 is also used as the steering velocity of the steering wheel 11. Hereinafter, the value of the steering angle of the steering wheel 11 detected based on the signal output from the rotational angle sensor 22 will be referred to as "steering angle $\theta x$", and the value of the steering angular velocity of the steering wheel 11, which is obtained by differentiating the steering angle $\theta x$ with respect to time, will be referred to as "steering velocity $\omega x$". The steering angle $\theta x$ in the clockwise direction or the counterclockwise direction with respect to the neutral position of the steering wheel 11 is indicated by the positive value or the negative value of the steering angle $\theta x$. In the embodiment, when the steering wheel 11 is at the neutral position, the steering angle $\theta x$ is "0". The steering angle in the clockwise direction with respect to the neutral position is indicated by a positive value. The steering angle in the counterclockwise direction with respect to the neutral position is indicated by a negative value.

The motor drive circuit 30 is a three-phase inverter circuit configured using six switching elements 31 to 36. Each of the switching elements 31 to 36 includes a metal-oxide semiconductor field-effect transistor (MOSFET). More specifically, a circuit formed by connecting the first switching element 31 to the second switching element 32 in series, a circuit formed by connecting the third switching element 33 to the fourth switching element 34 in series, and a circuit formed by connecting the fifth switching element 35 to the sixth switching element 36 in series are connected in parallel. A power supply line 37 extends from a portion between the two switching elements in each series circuit to the electric motor 20 (that is, the power supply lines 37 extend from the portion between the first switching element 31 and the second switching element 32, the portion between the third switching element 33 and the fourth switching element 34, and the portion between the fifth switching element 35 and the sixth switching element 36, to the electric motor 20).

An electric current sensor 38 is provided in the power supply lines 37 extending from the motor drive circuit 30 to the electric motor 20. The electric current sensor 38 detects (measures) the electric current that flows in each phase, and outputs a detection signal corresponding to the detected value of the electric current, to the electronic control unit 60. Hereinafter, the measured value of the electric current will be referred to as "motor current iuvw", and the electric current sensor 38 will be referred to as "motor current sensor 38".

The gate of each of the switching elements 31 to 36 is connected to the assist control portion 61 (described later) of the electronic control unit 60. A duty ratio is controlled based on a pulse width modulation (PWM) control signal output from the assist control portion 61. Thus, the drive voltage for the electric motor 20 is adjusted to a target voltage. As shown by a circuit symbol in FIG. 1, the MOSFET, which constitutes each of the switching elements 31 to 36, is provided with a diode.

Next, the power supply system of the electric power steering apparatus will be described. The power supply apparatus of the electric power steering apparatus includes the main power supply 100; the voltage-boosting circuit 40 that boosts the output voltage of the main power supply 100; the subsidiary power supply 50 connected in parallel to a circuit that connects the voltage-boosting circuit 40 to the motor drive circuit 30; and a power supply control portion 62 that is provided in the electronic control 60, and that controls the boosted voltage of the voltage-boosting circuit 40. The electric motor 20 and the motor drive circuit 30, which receive electric power from the power supply apparatus, function as the specific electric load.

The main power supply 100 is configured by connecting a main battery 101 in parallel to an alternator 102. The main battery 101 is an ordinary vehicle-mounted battery. The rated output voltage of the main battery 101 is 12 volts. The alternator 102 generates electric power due to the rotation of the engine. The rated output voltage of the alternator 102 is 14 volts. Accordingly, the main power supply 100 constitutes a vehicle-mounted power supply with a 14-volt system. The main battery 101 functions as the battery. The alternator 102 functions as the power generator.

The main power supply 100 supplies electric power to the electric power steering apparatus, and other vehicle-mounted electric loads such as a headlight. The power supply terminal (the positive terminal) of the main battery 101 is connected to a power source line 103. The ground terminal of the main battery 101 is connected to a ground line 111. The alternator 102 is provided between, and connected to the power source line 103 and the ground line 111.

A control system power supply line 104 and a drive system power supply line 105 extend from the power source line 103. The control system power supply line 104 functions as the power supply line used to supply electric power only to the electronic control unit 60. The drive system power supply line 105 functions as the power supply line used to supply electric power to both of the motor drive circuit 30 and the electronic control unit 60.

The control system power supply line 104 is connected to an ignition switch 106. The drive system power supply line 105 is connected to a power supply relay 107. The power supply relay 107 is turned on according to a control signal output from the assist control portion 61 of the electronic control unit 60 to form a power supply circuit that supplies electric power to the electric motor 20. The control system power supply line 104 is connected to the power supply positive terminal of the electronic control unit 60. A diode 108 is provided on the control system power supply line 104 at a position between the ignition switch 106 and the load (i.e., the electronic control unit 60). The cathode of the diode 108 is directed toward the electronic control unit 60, and the anode of the diode 108 is directed toward the main power supply 100. The diode 108 allows electric current to flow only in the direction in which the electric power is supplied. That is, the diode 108 is a back-flow prevention element.

A connection line 109, which is connected to the control system power supply line 104, extends from a portion of the drive system power supply line 105, which is located between the power supply relay 107 and the load. The connection line 109 is connected to a portion of the control system power supply line 104, which is located between the electronic control unit 60 and a position at which the diode 108 is connected to the control system power supply line 104. A diode 110 is connected to the connection line 109. The cathode of the diode 110 is directed toward the control system power supply line 104. The anode of the diode 110 is directed toward the drive system power supply line 105. Thus, the circuit is configured in a manner such that electric power is supplied from the drive system power supply line 105 to the control system power supply line 104 via the connection line 109, however, electric power is not supplied from the control system power supply line 104 to the drive system power supply line 105. The drive system power supply line 105 and the ground line 111 are connected to the voltage-boosting circuit 40. The ground line 111 is also connected to the ground terminal of the electronic control unit 60.

The voltage-boosting circuit 40 includes a capacitor 41, a voltage-boosting coil 42, a first voltage-boosting switching element 43, a second voltage-boosting switching element 44, and a capacitor 45. The capacitor 41 is provided between the drive system power supply line 105 and the ground line 111. The voltage-boosting coil 42 is provided in series with the drive system power supply line 105 at a position between the load and a point at which the capacitor 41 is connected to the drive system power supply line 105. The first voltage-boosting switching element 43 is provided between the ground line 111 and a portion of the drive system power supply line 105, which is located between the voltage-boosting coil 42 and the load. The second voltage-boosting switching element 44 is provided in series with the drive system power supply line 105 at a position between the load and a point at which the first voltage-boosting switching element 43 is connected to the drive system power supply line 105. The capacitor 45 is provided between the ground line 111 and a portion of the drive system power supply line 105, which is located between the second voltage-boosting switching element 44 and the load. The secondary side of the voltage-boosting circuit 40 is connected to a boosted-voltage power supply line 112.

In the embodiment, the MOSFET is used as each of the voltage-boosting switching elements 43 and 44. However, other switching elements may be used as each of the voltage-boosting switching elements 43 and 44. Also, as shown by the circuit symbol in FIG. 1, the MOSFET, which constitutes each of the voltage-boosting switching elements 43 and 44, is provided with a diode.

The power supply control portion 62 of the electronic control unit 60 controls the boosted voltage of the voltage-boosting circuit 40. The power supply control portion 62 outputs a pulse signal with a predetermined cycle to the gate of each of the first and second voltage-boosting switching elements 43 and 44 to turn on/off each of the first and second voltage-boosting switching elements 43 and 44 so that the voltage of the electric power supplied from the main power supply 100 is boosted, and a predetermined output voltage is generated on the boosted-voltage power supply line 112. In this case, the first and second voltage-boosting switching elements 43 and 44 are controlled in a manner such that when the first voltage-boosting switching element 43 is on, the second voltage-boosting switching element 44 is off, and when the first voltage-boosting switching element 43 is off, the second voltage-boosting switching element 44 is on. More specifically, in the voltage-boosting circuit 40, the first voltage-boosting switching element 43 is turned on, and the second voltage-boosting switching element 44 is turned off so that electric current is supplied to the voltage-boosting coil 42 for only a short time period, and electric power is stored in the voltage-boosting coil 42, and then, the first voltage-boosting switching element 43 is turned off and the second voltage-boosting switching element 44 is turned on so that the electric power stored in the voltage-boosting coil 42 is output.

The output voltage of the second voltage-boosting switching element 44 is smoothed by the capacitor 45. Accordingly, the stable electric power whose voltage is boosted is output from the boosted-voltage power supply line 112. In this case, a plurality of capacitors with different frequency characteristics may be connected in parallel to each other, to improve the smoothing characteristic. Also, the capacitor 41, which is provided at the input side of the voltage-boosting circuit 40, removes noise transferred toward the main power supply 100.

The boosted voltage (i.e., the output voltage) of the voltage-boosting circuit 40 is adjusted by controlling the duty ratio of each of the first and the second voltage-boosting switching elements 43 and 44 (i.e., by executing the PWM control for each of the first and the second voltage-boosting switching elements 43 and 44). As the on-duty ratio of the second voltage-boosting switching element 44 (i.e., the ratio of a time period during which the second voltage-boosting switching element 44 is on) increases, the boosted voltage increases. For example, the voltage-boosting circuit 40 according to the embodiment is configured so that the boosted voltage is adjusted in a range of 20 volts to 50 volts. A general purpose DC-DC converter may be used as the voltage-boosting circuit 40.

A boosted-voltage drive line 113 and a charge/discharge line 114 extend from the boosted-voltage power supply line 112. The boosted-voltage drive line 113 is connected to the power input portion of the motor drive circuit 30. The charge/discharge line 114 is connected to the positive terminal of the subsidiary power supply 50.

The subsidiary power supply 50 is charged with the electric power output from the voltage-boosting circuit 40. The subsidiary power supply 50 is an electric power storage device that assists the main power supply 100, and supplies the electric power to the motor drive circuit 30, when the motor drive circuit 30 needs large electric power. Accordingly, the subsidiary power supply 50 is configured by connecting a plurality of power storage cells in series so that the voltage equivalent to the boosted voltage of the voltage-boosting circuit 40 can be maintained. The ground terminal of the subsidiary power supply 50 is connected to the ground line 111. As the subsidiary power supply, for example, a capacitor (electric double layer capacitor) may be used.

The subsidiary power supply 50 is able to supply electric power also to the electronic control unit 60. When the main power supply 100 is not able to appropriately supply electric power to the electronic control unit 60, the subsidiary power supply 50 supplies electric power to the electronic control unit 60, in place of the main power supply 100. A voltage-reducing circuit (DC-DC converter; not shown) is provided in the power receiving portion of the electronic control unit 60. The voltage-reducing circuit reduces the voltage of the electric power supplied from the subsidiary power supply 50. Thus, the voltage of the electric power supplied from the subsidiary power supply 50 is adjusted to an appropriate voltage using the voltage-reducing circuit.

A voltage sensor 51 is provided at the output side of the voltage-boosting circuit 40. The voltage sensor 51 detects a voltage between the boosted-voltage power supply line 112 and the ground line 111, and outputs a signal corresponding to the detected value to the power supply control portion 62. In the circuit configuration, the charge/discharge line 114 is connected to the boosted-voltage power supply line 112. Therefore, the value measured by the voltage sensor 51 is one of the output voltage (i.e., the boosted voltage) of the voltage-boosting circuit 40 and the output voltage of the subsidiary power supply 50 (i.e., the power supply voltage), which is higher than the other. Hereinafter, the value of the voltage measured by the voltage sensor 51 will be referred to as "output voltage vout".

A subsidiary power supply current sensor 52 is provided on the charge/discharge line 114. The subsidiary power supply current sensor 52 detects the electric current that flows to/from the subsidiary power supply 50. The subsidiary power supply current sensor 52 determines the direction in which the electric current flows, that is, distinguishes between a charge current that flows from the voltage-boosting circuit 40 to the subsidiary power supply 50, and a discharge current that flows from the subsidiary power supply 50 to the motor drive circuit 30. The subsidiary power supply current sensor 52 measures the magnitude of each of the charge current and the discharge current, and outputs a detection signal corresponding to the measured value, to the power supply control portion 62. Hereinafter, the measured value of the electric current detected by the subsidiary power supply current sensor 52 will be referred to as "subsidiary power supply current isub". In the embodiment, when the charge current flows, the subsidiary power supply current isub is indicated by a positive value. When the discharge current flows, the subsidiary power supply current isub is indicated by a negative value.

The electronic control unit 60 includes a microcomputer that includes a CPU, a ROM, and a RAM. The electronic control unit 60 is divided into the assist control portion 61 and the power supply control portion 62, based on the respective functions. The assist control portion 61 is connected to the steering torque sensor 21, the rotational angle sensor 22, the motor current sensor 38, and a vehicle-speed sensor 23. Thus, the assist control portion 61 receives sensor signals that indicate the steering torque Tx, the steering angle θx, the motor current iuvw, and a vehicle speed Vx. Based on the sensor signals, the assist control portion 61 outputs the PWM control signal to the motor drive circuit 30 to control the operation of the electric motor 20, thereby assisting the steering operation performed by the driver.

The power supply control portion 62 controls the charging/discharging of the subsidiary power supply 50 by controlling the boosted voltage of the voltage-boosting circuit 40. The power supply control portion 62 is connected to the voltage sensor 51 and the subsidiary power supply current sensor 52. The power supply control portion 62 receives the sensor signals that indicate the output voltage vout, and the subsidiary power supply current isub. Signals are transmitted between the power supply control portion 62 and the assist control portion 61. The power supply control portion 62 also receives the sensor signals that indicate the vehicle speed Vx and the motor current iuvw input to the assist control portion 61. The power supply control portion 62 outputs the PWM control signal to the voltage-boosting circuit 40 based on the sensor signals. The boosted voltage of the voltage-boosting circuit 40, that is, the output voltage of the voltage-boosting circuit 40 is changed by controlling the duty ratio of each of the first and second voltage-boosting switching elements 43 and 44 according to the PWM control signal input to the voltage-boosting circuit 40.

Figure 2:
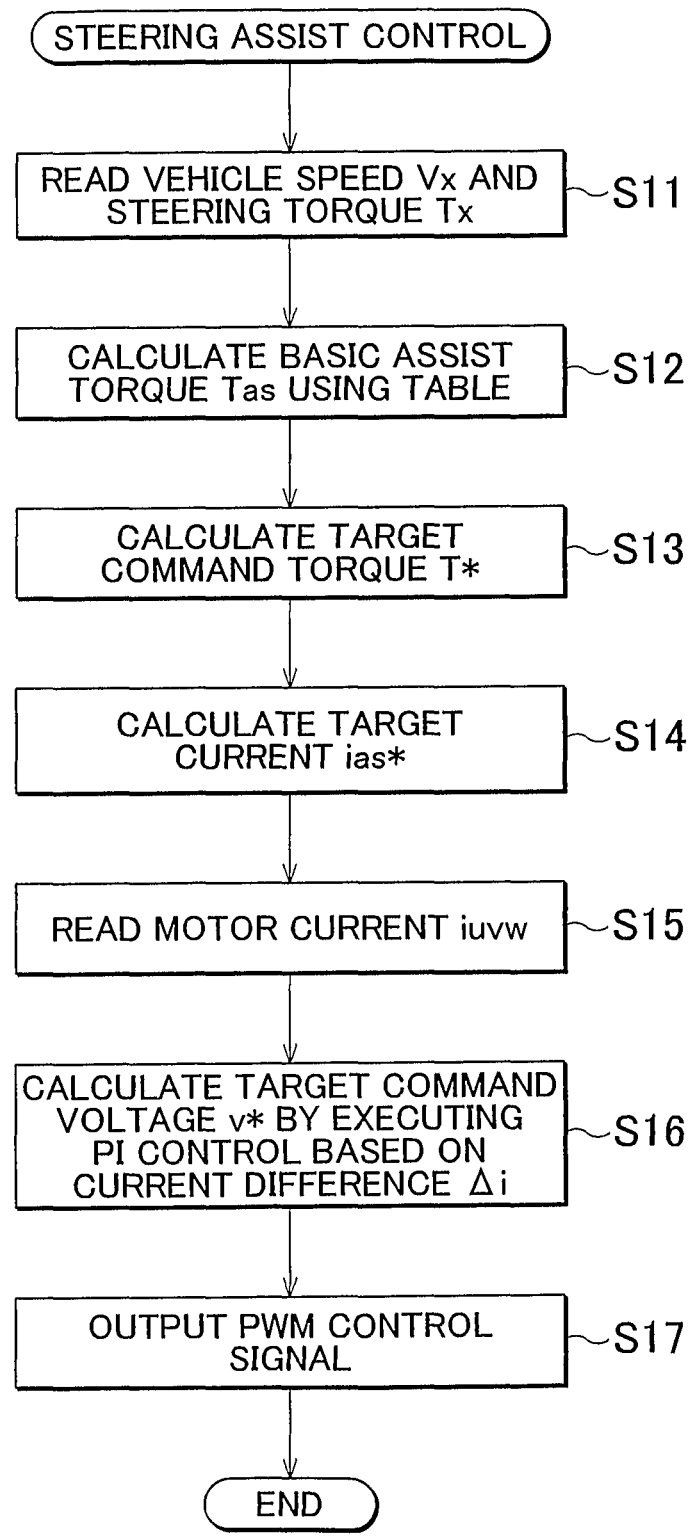
FIG. 2 is a flowchart showing a steering assist control routine according to the embodiment of the invention.

Next, a steering assist control executed by the assist control portion 61 of the electronic control unit 60 will be described. FIG. 2 shows a steering assist control routine executed by the assist control portion 61. The steering assist control routine in the form of a control program is stored in the ROM of the electronic control unit 60. When the ignition switch 106 is turned on, the steering assist control routine is started. The steering assist control routine is executed in a predetermined short cycle, and repeatedly executed.

When the control routine is started, the assist control portion 61 reads the vehicle speed Vx detected by the vehicle-speed sensor 23, and the steering torque Tx detected by the steering torque sensor 21, in step S11.

Figure 3:
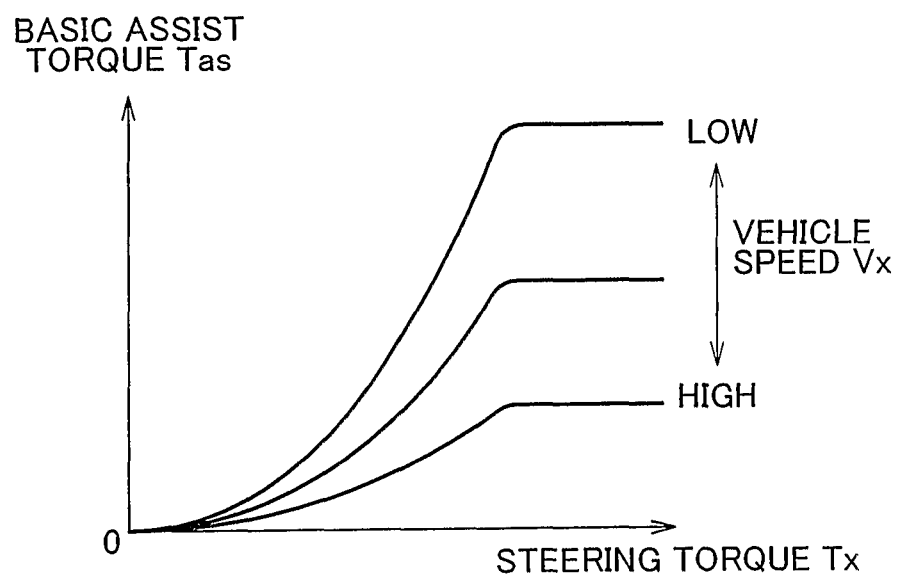
FIG. 3 is a graph showing an assist torque table according to the embodiment of the invention.

Subsequently, in step S12, the assist control portion 61 calculates basic assist torque Tas that is set based on the input vehicle speed Vx and the input steering torque Tx with reference to an assist torque table shown in FIG. 3. In the assist torque table, the relation between the steering torque Tx and the basic assist torque Tas is set so that as the steering torque Tx increases, the basic assist torque Tas increases. Further, the relation between the steering torque Tx and the basic assist torque Tas is set so that as the vehicle speed Vx decreases, the basic assist torque Tas corresponding to the same value of the steering torque Tx increases. The assist torque table is stored in the ROM of the electronic control unit 60. The assist torque table in FIG. 3 shows the characteristic of the basic assist torque Tas with respect to the steering torque Tx when the steering wheel 11 is turned in the clockwise direction. When the steering wheel 11 is turned in the counterclockwise direction, the basic assist torque Tas changes with respect to the absolute value of the steering torque Tx in the same manner as the manner shown in FIG. 3.

Subsequently, in step S13, the assist control portion 61 calculates a target command torque T* by adding compensation torque to the basic assist torque Tas. For example, the compensation torque is calculated by summing a returning force of the steering shaft 12 toward an original position, and returning torque corresponding to a resisting force that resists the rotational force of the steering shaft 12. The returning force increases in proportion to the steering angle θx. The resisting force increases in proportion to the steering velocity ωx. When the compensation torque is calculated, the rotational angle of the electric motor 20 (equivalent to the steering angle θx of the steering wheel 11) detected by the rotational angle sensor 22 and input to the assist torque control portion 61 is used. The steering velocity ωx is obtained by differentiating the steering angle θx of the steering wheel 11 with respect to time.

Subsequently, in step S14, the assist control portion 61 calculates a target current ias* that changes in proportion to the target command torque T*. The target current ias* is obtained by dividing the target command torque T* by a torque constant.

Subsequently, in step S15, the assist control portion 61 reads the motor current iuvw that flows to the electric motor 20, from the motor current sensor 38. Subsequently, in step S16, the assist control portion 61 calculates a difference Δi between the motor current iuvw and the target current ias* calculated in step S14. Then, the assist control portion 61 calculates a target command voltage v* by executing a proportional-integral (PI) control based on the difference Δi.

Then, in step S17, the assist control portion 61 outputs the PWM control signal corresponding to the target command voltage v* to the motor drive circuit 30, and then, the control routine ends. The control routine is executed in the predetermined short cycle, and repeatedly executed. Thus, the duty ratio of each of the switching elements 31 to 36 in the motor drive circuit 30 is controlled by executing the control routine. Accordingly, it is possible to obtain desired assist torque according to the steering operation performed by the driver.

During the steering assist control, large electric power is required, particularly when the steering wheel 11 is operated while the vehicle is stopped, or the vehicle travels at a low speed. However, it is not desirable that the capacity of the main power supply 100 should be made large to prepare for temporary consumption of large electric power. Accordingly, in the electric power steering apparatus in the embodiment, the capacity of the main power supply 100 is not made large, and the subsidiary power supply 50 is provided. The subsidiary power supply 50 assists the supply of electric power when large electric power is temporarily consumed. Also, in the electric power steering apparatus in the embodiment, the voltage-boosting circuit 40 is provided to efficiently drive the electric motor 20. Thus, the system, in which the electric power whose voltage is boosted is supplied to the motor drive circuit 30 and the subsidiary power supply 50, is configured.

When the power supply system is configured, the sufficient performance (the sufficient assist performance) of the electric power steering apparatus is provided by using both of the main power supply 100 and the subsidiary power supply 50. Therefore, it is necessary to appropriately maintain the subsidiary power supply 50 in a good state to provide the sufficient assist performance. If the subsidiary power supply 50 is overcharged, or charging and discharging of the subsidiary power supply 50 are repeatedly performed, the subsidiary power supply 50 quickly deteriorates, and the lifetime of the subsidiary power supply 50 is shortened. Also, when the amount of charge in the subsidiary power supply 50 is insufficient, the sufficient assist performance is not provided. Also, the subsidiary power supply 50 needs to be efficiently charged by using excess energy held in the vehicle as much as possible. Thus, in the embodiment, the charging/discharging of the subsidiary power supply 50 is controlled in the manner described below.

Figure 4:
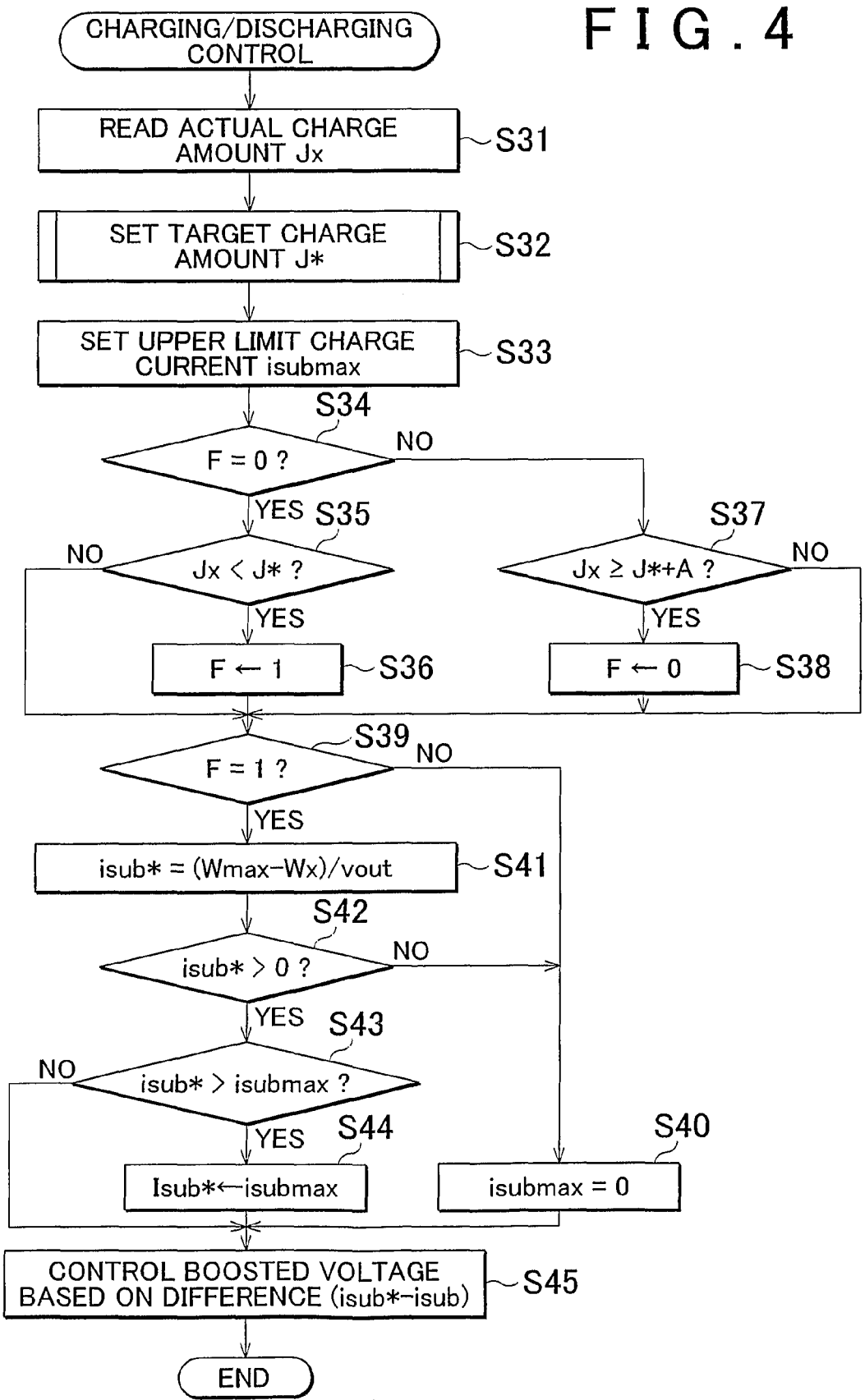
FIG. 4 is a flowchart showing a charging/discharging control routine according to the embodiment of the invention.

FIG. 4 shows a charging/discharging control routine executed by the power supply control portion 62. The charging/discharging control routine in the form of a control program is stored in the ROM of the electronic control unit 60. When the ignition switch 106 is turned on, the charging/discharging control routine is started. The charging/discharging control routine is executed in a predetermined short cycle, and repeatedly executed.

When the control routine is started, first, in step S31, the power supply control portion 62 reads data that indicates an actual charge amount Jx that is the actual amount of charge in the subsidiary power supply 50. The actual charge amount Jx is sequentially calculated by an actual charge amount detection routine (FIG. 9) described later. Thus, the process in step S31 is the process of reading the data that indicates the latest actual charge amount Jx calculated by the actual charge amount detection routine.

Figure 5:
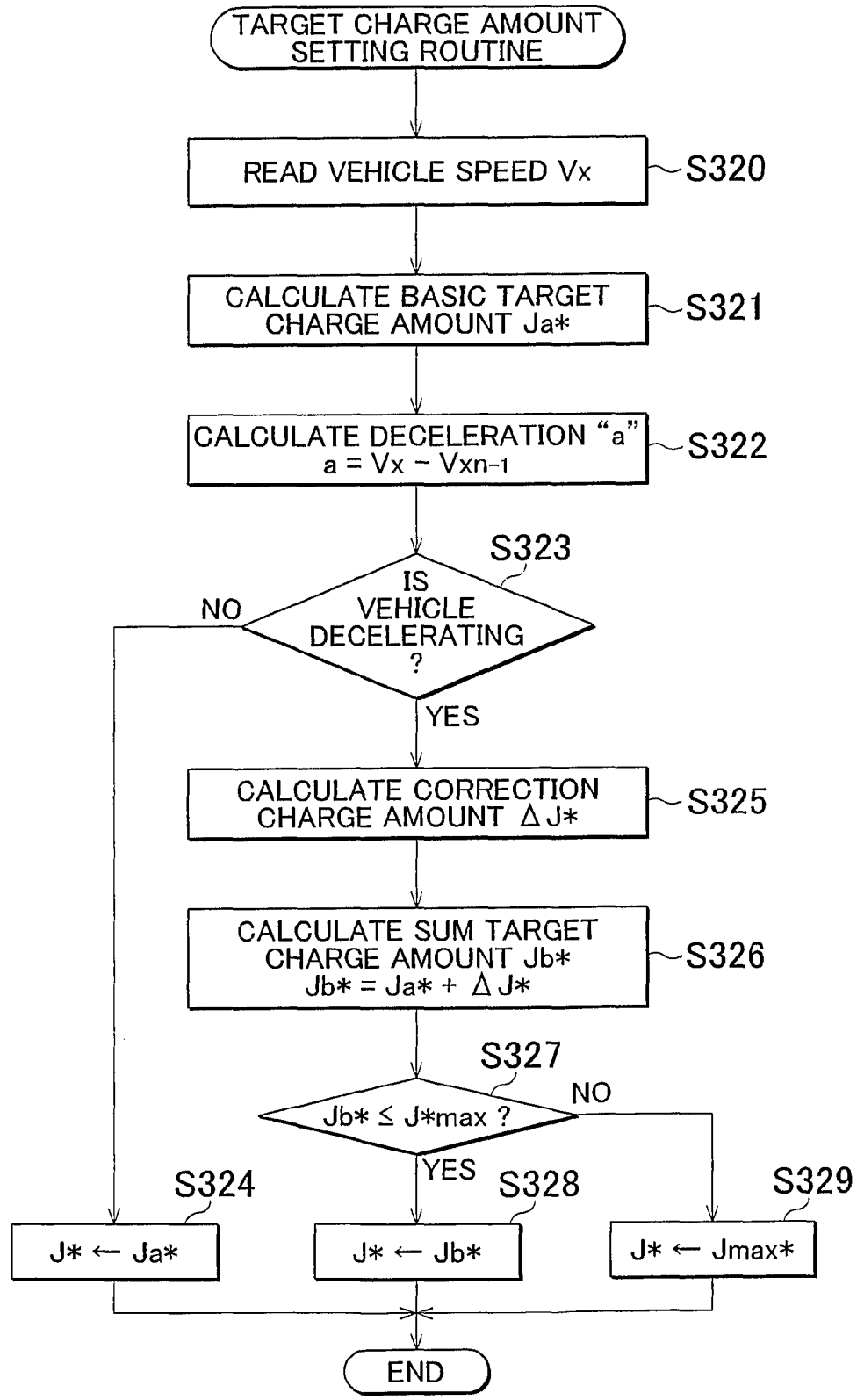
FIG. 5 is a flowchart showing a target charge amount setting routine according to the embodiment of the invention.

Subsequently, in step S32, the power supply control portion 62 sets a target charge amount J*. The process in step S32 will be described with reference to a flowchart in FIG. 5. FIG. 5 shows a target charge amount setting routine. That is, FIG. 5 describes the process in step S32 in detail.

Figure 6:
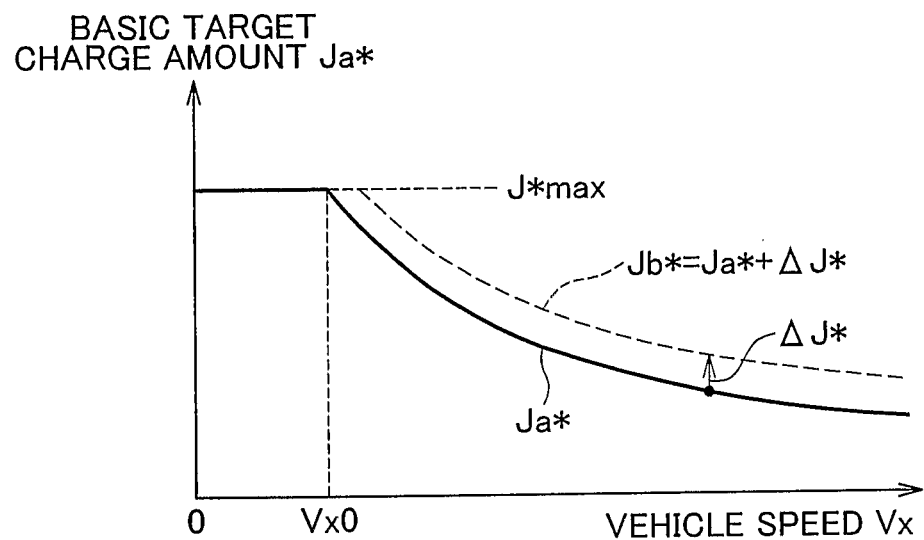
FIG. 6 is a graph showing a basic target charge amount setting table according to the embodiment of the invention.

First, in step S320, the power supply control portion 62 reads the vehicle speed Vx detected by the vehicle-speed sensor 23. Subsequently, in step S321, the power supply control portion 62 calculates a basic target charge amount Ja* that is set based on the vehicle speed Vx, with reference to a basic target charge amount table shown in FIG. 6. The basic target charge amount table is stored in the ROM of the electronic control unit 60. The relation between the vehicle speed Vx and the basic target charge amount Ja* is set so that as the vehicle speed Vx increases, the basic target charge amount Ja* decreases, as shown by the solid line in FIG. 6. In the embodiment, when the vehicle speed Vx is lower than a reference vehicle speed Vx0, the basic target charge amount Ja* is set to be equal to an upper limit charge amount J*max that is a constant value. The upper limit charge amount J*max is the upper limit of the amount of charge in the subsidiary power supply 50, which is set to prevent overcharging of the subsidiary power supply 50. The upper limit charge amount J*max is appropriately set taking into account, for example, the capacity of the subsidiary power supply 50.

When the above-described steering assist control is executed, the basic assist torque Tas is set to increase as the vehicle speed Vx decreases, as shown in FIG. 3, and therefore, the electric power consumed in the motor drive circuit 30 (i.e., the electric power consumed to drive the electric motor 20) increases. Accordingly, in the target charge amount setting routine, the basic target charge amount Ja* in the subsidiary power supply 50 is set according to the required electric power (the electric power required to assist the steering operation) that changes according to the vehicle speed.

Subsequently, in step S322, the power supply control portion 62 calculates deceleration "a" of the vehicle. The deceleration "a" is the rate at which the vehicle speed decreases (i.e., the differential value of the vehicle speed). In the embodiment, the deceleration "a" is calculated by subtracting a preceding vehicle speed Vxn−1 that is calculated in an immediately preceding cycle, from the vehicle speed Vx that is detected in a current cycle (Vx−Vxn−1). The preceding vehicle speed Vxn−1 is the vehicle speed Vx detected one cycle earlier, when the target charge amount setting routine is executed in a predetermined cycle, and repeatedly executed. Hereinafter, the magnitude of the deceleration "a" will be described on the assumption that as the value of "a" (=Vx−Vxn−1) decreases (i.e., as the absolute value of the negative value increases), the deceleration "a" increases.

Subsequently, in step S323, the power supply control portion 62 determines whether the vehicle is decelerating based on the deceleration "a". When the deceleration "a" is a negative value, the vehicle is decelerating. When it is determined that the vehicle is not decelerating in step S323, the power supply control portion 62 sets the final target charge amount J* to the basic target charge amount Ja* (J*←Ja*) in step S324.

Figure 7:
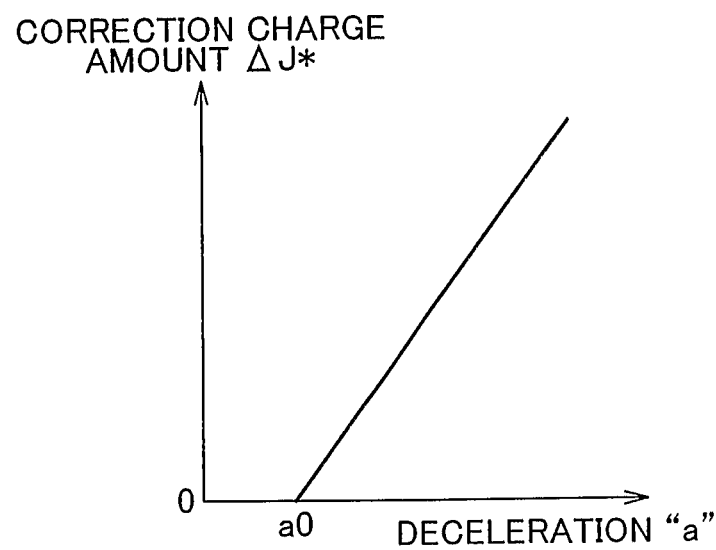
FIG. 7 is a graph showing a correction charge amount setting table according to the embodiment of the invention.

When it is determined that the vehicle is decelerating (YES in step S323), the power supply control portion 62 calculates a correction charge amount ΔJ* with reference to a correction charge amount setting table shown in FIG. 7 in step S325. In the correction charge amount setting table, the relation between the deceleration "a" and the correction charge amount ΔJ* is set so that as the deceleration "a" increases (i.e., the absolute value of "a" increases), the correction charge amount ΔJ* increases. The correction charge amount setting table is stored in the ROM of the electronic control unit 60. In this example, when the deceleration "a" is below reference deceleration a0, the correction charge amount ΔJ* is set to zero. When the deceleration "a" is equal to or above the reference declaration a0, the correction charge amount ΔJ* is set to increase in proportion to the increase in the deceleration "a". That is, a dead zone is set so that the correction charge amount ΔJ* is not added to the basic target charge amount Ja*, when the deceleration "a" is small.

Subsequently, in step S326, the power supply control portion 62 calculates a sum target charge amount Jb* by adding the correction charge amount ΔJ* to the basic target charge amount Ja* (Jb*=Ja*+ΔJ*). Thus, the sum target charge amount Jb* is indicated as a point on the dashed line in FIG. 6.

Subsequently, in step S327, the power supply control portion 62 determines whether the sum target charge amount Jb* is equal to or smaller than the upper limit charge amount J*max. When the sum target charge amount Jb* is equal to or smaller than the upper limit charge amount J*max, the power supply control portion 62 sets the final target charge amount J* to the sum target charge amount Jb* (J*←Jb*) in step S328. When the sum target charge amount Jb* exceeds the upper limit charge amount J*max (NO in step S327), the power supply control portion 62 sets the final target charge amount J* to the upper limit charge amount J*max (J*←J*max) in step S329.

In the target charge amount setting routine, the target charge amount J* is set to increase as the deceleration "a" increases. After the power supply control portion 62 sets the final target charge amount J*, the routine ends, and the process proceeds to step S33 in FIG. 4.

Figure 8:
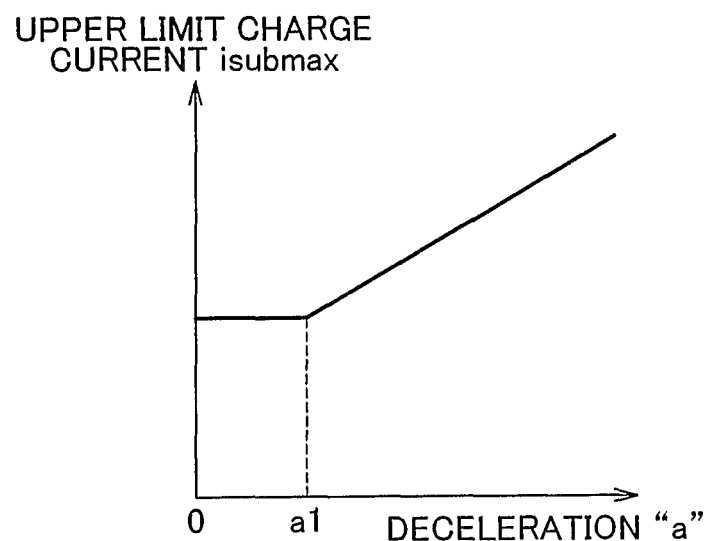
FIG. 8 is a graph showing an upper limit charge current setting table according to the embodiment of the invention.

In step S33, the power supply control portion 62 sets an upper limit charge current isubmax with reference to an upper limit charge current setting table shown in FIG. 8. In the upper limit charge current setting table, the relation between the deceleration "a" and the upper limit charge current isubmax is set so that as the deceleration "a" increases (i.e., the absolute value of "a" increases), the upper limit charge current isubmax increases. The upper limit charge current setting table is stored in the ROM of the electronic control unit 60. In the example, when the deceleration "a" is below reference deceleration a1, the upper limit charge current isubmax is fixed to a constant value. When the deceleration "a" is equal to or above the reference deceleration a1, the upper limit charge current isubmax increases in proportion to the increase in the deceleration "a". That is, a dead zone is set so that the upper limit charge current isubmax is not changed when the deceleration "a" is small.

Subsequently, in step S34, the power supply control portion 62 determines whether the value of a flag F is "0". The flag F indicates whether the subsidiary power supply 50 needs to be charged, as shown by the process described later. When the value of the flag F is 0 (F=0), the subsidiary power supply 50 does not need to be charged. When the value of the flag F is 1 (F=1), the subsidiary power supply 50 needs to be charged. When the charging/discharging control routine is started, the value of the flag F is set to "0".

When the value of the flag F is "0" (YES in step S34), the power supply control portion 62 determines whether the actual charge amount Jx is smaller than the target charge amount J* in step S35. The process in step S35 is executed to determine whether the amount of charge in the subsidiary power supply 50 is insufficient. When the actual charge amount Jx is smaller than the target charge amount J* (Jx<J*) (YES in step S35), the power supply control portion 62 determines that the amount of charge is insufficient, and sets the flag F to "1" in step S36. When the actual charge amount Jx is equal to or larger than the target charge amount J* (Jx≥J*) (NO in step S35), the power supply control portion 62 determines that the amount of charge is not insufficient, and does not change the value of the flag F. Thus, the value of the flag F is maintained at "0".

When the value of the flag F is "1" in step S34 (NO in step S34), the power supply control portion 62 determines whether the actual charge amount Jx has reached a charge amount (J*+A) obtained by adding a dead zone value A (a positive value) to the target charge amount J*, in step S37. The process in step S37 is executed to determine whether the actual charge amount Jx, which has been insufficient, is sufficient. When the actual charge amount Jx is equal to or larger than the charge amount (J*+A) (Jx≥J*+A) (YES in step S37), the power supply control portion 62 determines that the actual charge amount Jx, which has been insufficient, is sufficient. Accordingly, in step S38, the power supply control portion 62 sets the value of the flag F to "0". When the actual charge amount Jx is smaller than the charge amount (J*+A) (Jx<J*+A) (NO in step S37), the power supply control portion 62 determines that the actual charge amount Jx is insufficient.

Accordingly, the power supply control portion 62 does not change the value of the flag F. Thus, the value of the flag F is maintained at "1".

The dead zone value A is set so that the result of the comparison between the actual charge amount Jx and the target charge amount J* does not frequently fluctuate.

After the value of the flag F is set, the value of the flag F is confirmed in step S39. When the value of the flag F is "0" (NO in step S39), that is, when it is determined that the subsidiary power supply 50 does not need to be charged, the power supply control portion 62 sets the target charge/discharge current isub* to zero (isub*=0) in step S40. When the value of the flag F is "1" (YES in step S39), that is, when it is determined that the amount of charge in the subsidiary power supply 50 is insufficient, the target charge/discharge current isub* is calculated according to the following equation, in step S41. isub*=(Wmax−Wx)/vout.

In the equation, Wmax is allowable output electric power of the voltage-boosting circuit 40; Wx is electric power consumed in the motor drive circuit 30; and vout is an output voltage detected by the voltage sensor 51. The allowable output electric power Wmax is set in advance based on the specifications of the voltage-boosting circuit 40. Also, the electric power Wx consumed in the motor drive circuit 30 is calculated by multiplying the output voltage vout detected by the voltage sensor 51 by the motor current iuvw detected by the motor current sensor 38. Accordingly, the process in step S41 includes the process of reading the value of the voltage measured by the voltage sensor 51, and the process of reading the value of the current measured by the motor current sensor 38. A current sensor (not shown) that measures the electric current that flows in the boosted-voltage drive line 113 may be provided, and the electric power Wx consumed in the motor drive circuit 30 may be calculated by multiplying the value of the electric current detected by the current sensor, by the output voltage vout detected by the voltage sensor 51.

Subsequently, in step S42, the power supply control portion 62 determines whether the target charge/discharge current isub* is a positive value. As described above, the target charge/discharge current isub* is calculated by obtaining a value by subtracting the electric power Wx consumed in the motor drive circuit 30 from the allowable output electric power Wmax of the voltage-boosting circuit 40, and dividing the obtained value by the output voltage vout. Accordingly, when the electric power Wx consumed by the electric motor 20 is smaller than the allowable output electric power Wmax of the voltage-boosting circuit 40, the target charge/discharge current isub* is larger than 0 (isub*>0) (YES in step S42). When the electric power Wx consumed in the motor drive circuit 30 is equal to or larger than the allowable output electric power Wmax of the voltage-boosting circuit 40, the target charge/discharge current isub* is equal to or smaller than 0 (NO in step S42).

When the target charge/discharge current isub* is equal to or smaller than zero (isub*≤0), the power supply control portion 62 newly sets the target charge/discharge current isub* to zero (isub*=0), in step S40. When the target charge/discharge current isub* is a positive value (isub*>0), the power supply control portion 62 determines whether the target charge/discharge current isub* exceeds the upper limit charge current isubmax set in step S33, in step S43. When the target charge/discharge current isub* does not exceed the upper limit charge current isubmax (NO in step S43), the power supply control portion 62 does not change the target charge/discharge current isub* calculated in step S41. When the target charge/discharge current isub* exceeds the upper limit charge current isubmax (YES in step S43), the power supply control portion 62 sets the final target charge/discharge current isub* to the upper limit charge current isubmax (isub*←isubmax) in step S44.

After the power supply control portion 62 sets the target charge/discharge current isub*, the power supply control portion 62 controls the boosted voltage of the voltage-boosting circuit 40 through feedback, based on the difference between the target charge/discharge current isub* and a subsidiary power supply current isub, in step S45. That is, the subsidiary power supply current isub detected by the subsidiary power supply current sensor 52 is fed back, and the boosted voltage of the voltage-boosting circuit 40 is controlled to decrease the difference (isub*−isub) between the target charge/discharge current isub* and the subsidiary power supply current isub. In the embodiment, a proportional-integral-derivative (PID) control is executed based on the difference (isub*−isub). The process in step S45 includes the process of reading the subsidiary power supply current isub detected by the subsidiary power supply current sensor 52.

The power supply control portion 62 outputs a pulse signal with a predetermined cycle to the gate of each of the first and second voltage-boosting switching elements 43 and 44 in the voltage-boosting circuit 40 to turn on/off each of the first and second voltage-boosting switching elements 43 and 44 so that the electric power supplied from the main power supply 100 is boosted. In this case, the boosted voltage is controlled by changing the duty ratio of the pulse signal.

After the power supply control portion 62 executes the process in step S45, the charging/discharging control routine ends. The charging/discharging control routine is executed in the predetermined short cycle, and repeatedly executed.

In the charging/discharging control routine, when the target charge/discharge current isub* is a positive value (isub*>0), the boosted voltage of the voltage-boosting circuit 40 is controlled so that the electric current flows toward the subsidiary power supply 50 to charge the subsidiary power supply 50, and the electric current is equal to the target charge/discharge current isub*. Accordingly, the boosted voltage of the voltage-boosting circuit 40 is controlled to be higher than the voltage of the subsidiary power supply 50. That is, when the actual charge amount Jx is smaller than the target charge amount J*, and the electric power output from the voltage-boosting circuit 40 is larger than the electric power consumed in the motor drive circuit 30 (the electric power consumed to drive the electric motor 20), the subsidiary power supply 50 is charged with the electric power from the main power supply 100 via the voltage-boosting circuit 40. Further, the target charge/discharge current isub* is set so that the supply of the electric power to the motor drive circuit 30 is ensured, the target charge/discharge current isub* does not exceed the upper limit charge current isubmax, and the subsidiary power supply 50 is charged by making full use of the power supply ability of the voltage-boosting circuit 40. Therefore, the subsidiary power supply 50 is quickly charged.

When the target charge/discharge current isub* is set to zero (isub*=0), the boosted voltage of the voltage-boosting circuit 40 is controlled so that neither the charge current nor the discharge current flows to/from the subsidiary power supply 50. Accordingly, the boosted voltage of the voltage-boosting circuit 40 is controlled to the voltage that is equal to the voltage of the subsidiary power supply 50. Therefore, the subsidiary power supply 50 is not charged. Also, the boosted voltage is maintained so that the discharge current does not flow from the subsidiary power supply 50, as long as the electric power consumed in the motor drive circuit 30 does not exceed the upper limit of the electric power that can be output from the voltage-boosting circuit 40. Thus, the motor drive circuit 30 is operated using only the electric power output from the voltage-boosting circuit 40. When the electric power consumed in the motor drive circuit 30 exceeds the upper limit of the electric power that can be output from the voltage-boosting circuit 40, it is not possible to maintain the discharge current from the subsidiary power supply 50 at zero, and as a result, the boosted voltage decreases, regardless of the control of the boosted voltage of the voltage-boosting circuit 40. Thus, the electric power is supplied from the subsidiary power source 50 to the motor drive circuit 30 to compensate for the shortage of the electric power. That is, when the electric power consumed in the motor drive circuit 30 is equal to or smaller than the upper limit of the electric power that can be output from the voltage-boosting circuit 40, the electric power in the subsidiary power supply 50 is not used. Only when the required electric power is larger than the upper limit of the electric power that can be output from the voltage-boosting circuit 40, the electric power is supplied from the main power supply 100 and the subsidiary power supply 50 to the motor drive circuit 30.

Also, in the charging/discharging control for the subsidiary power supply 50, the target charge amount J* and the upper limit charge current isubmax for the subsidiary power supply 50 are set according to the deceleration "a" of the vehicle. Therefore, excess kinetic energy in the vehicle is actively and efficiently recovered, and the recovered energy is used to charge the subsidiary power supply 50.

When the vehicle is decelerating, the kinetic energy in the vehicle is usually consumed by a brake. In this situation, there is excess kinetic energy. Particularly, as the deceleration "a" increases, the excess kinetic energy increases. Accordingly, in the embodiment, as the deceleration "a" increases, the target charge amount J* in the subsidiary power supply 50 is increased. The charging control that charges the subsidiary power supply 50 is executed based on the increased target charge amount J*. Thus, the excess kinetic energy is effectively used to charge the subsidiary power supply 50 via the alternator 102. Further, because the upper limit charge current isubmax is increased simultaneously with the increase in the target charge amount J*, it is possible to increase the speed at which the subsidiary power supply 50 is charged. As a result, the subsidiary power supply 50 is efficiently charged.

Also, as the vehicle speed Vx increases, the target charge amount J* is set to decrease according to the electric power required to assist the steering operation. Therefore, the subsidiary power supply 50 is not excessively charged. This increases the lifetime of the subsidiary power supply 50. When the vehicle travels at a high speed, the target charge amount J* is set to be small. When the vehicle is decelerating, the amount of charge in the subsidiary power supply 50 is quickly increased. Then, when the steering operation is performed while the vehicle travels at a low speed or the vehicle is stopped, it is possible to supply the sufficient electric power to the motor drive circuit 30.

Figure 9:
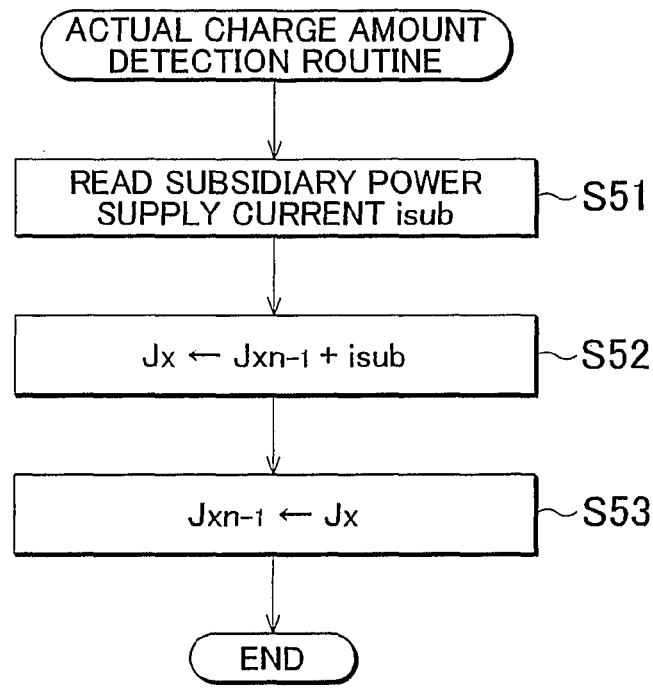
FIG. 9 is a flowchart showing an actual charge amount detection routine according to the embodiment of the invention.

Next, an actual charge amount detection routine will be described. FIG. 9 shows the actual charge amount detection routine executed by the power supply control portion 62. The actual charge amount detection routine in the form of a control program is stored in the ROM of the electronic control unit 60. When the ignition switch 106 is turned on, the actual charge amount detection routine is started. The actual charge amount detection routine is executed in a predetermined short cycle, and repeatedly executed. The actual charge amount detected by the actual charge amount detection routine is the actual charge amount Jx read in step S31.

When the actual charge amount detection routine is started, in step S51, the power supply control portion 62 reads the subsidiary power supply current isub detected by the subsidiary power supply current sensor 52. Subsequently, in step S52, the actual charge amount Jx at the current time point is calculated according to the following equation. Jx=Jxn−1+isub. In the equation, Jxn−1 is a preceding actual charge amount. The preceding actual charge amount is the actual charge amount Jx calculated one cycle earlier, when the actual charge amount detection routine is executed in the predetermined cycle, and repeatedly executed.

In the embodiment, when the ignition switch 106 is turned off, the electric charge in the subsidiary power supply 50 is discharged to the main battery 101. Therefore, when the actual charge amount detection routine is started, the actual charge amount Jx in the subsidiary power supply 50 is a low value that is substantially constant. Accordingly, as the initial value of the preceding actual charge amount Jxn−1, a fixed value that is set in advance (for example, Jxn−1=0) is used.

Subsequently, in step S53, the power supply control portion 62 stores the actual charge amount Jx at the current time point in the RAM as the preceding actual charge amount Jxn−1. Then, the actual charge amount detection routine ends. The actual charge amount detection routine is executed in the predetermined short cycle, and repeatedly executed. Accordingly, the actual charge amount Jx calculated in the current cycle is used as the preceding actual charge amount Jxn−1 in step S52 in the next cycle (one cycle later).

The power supply control portion 62 repeatedly executes the routine during the period in which the ignition switch 106 is on. Thus, the actual charge amount Jx is determined by accumulating the values of the subsidiary power supply current isub. In this case, when the charge current flows, the values of the subsidiary power supply current isub are accumulated to increase the actual charge amount Jx. When the discharge current flows, the values of the subsidiary power supply current isub are accumulated to decrease the actual charge amount Jx. Accordingly, it is possible to appropriately detect the amount of charge in the subsidiary power supply 50.

Next, the discharging control that discharges the electric charges from the subsidiary power supply 50 will be described. In the case where a capacitor is used as the subsidiary power supply 50, the lifetime of the subsidiary power supply 50 is increased by discharging the electric charge when the subsidiary power supply 50 is not used for a long time. Also, when the actual charge amount Jx in the subsidiary power supply 50 is detected based on the value obtained by accumulating the values of the subsidiary power supply current isub, it is difficult to estimate the initial value of the amount of charge when the vehicle is started. Accordingly, in the embodiment, when the ignition switch 106 is turned off, the electric charge in the subsidiary power supply 50 is discharged to the main battery 101 via the voltage-boosting circuit 40. Hereinafter, the control process will be described with reference to FIG. 10.

Figure 10:
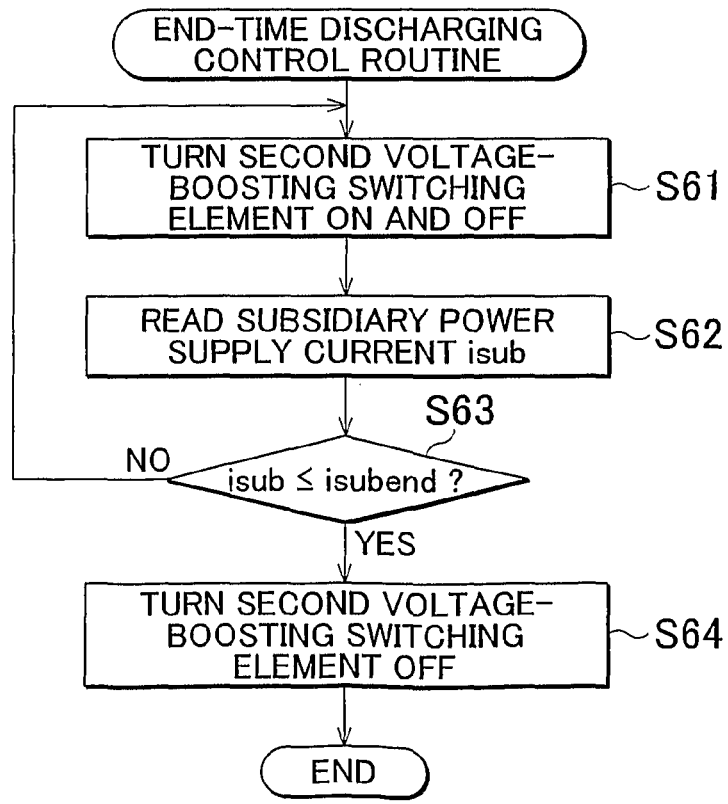
FIG. 10 is a flowchart showing an end-time discharging control routine according to the embodiment of the invention.

FIG. 10 shows an end-time discharging control routine executed by the power supply control portion 62. The end-time discharging control routine in the form of a control program is stored in the ROM of the electronic control unit 60. When it is detected that the ignition switch 106 is turned off, the end-time discharging control routine is started. When the end-time discharging control routine is started, in step S61, the power supply control portion 62 outputs a pulse signal with a predetermined cycle to the gate of the second voltage-boosting switching element 44 in the voltage-boosting circuit 40, to turn on/off the second voltage-boosting switching element 44 at a predetermined duty ratio. Because the steering assist control ends during the period in which the ignition switch 106 is off, each of the switching elements 31 to 36 in the motor drive circuit 30 is maintained in the off state. Accordingly, the electric charge in the subsidiary power supply 50 is discharged to the main battery 101. In this case, it is possible to limit the value of the discharge current that flows from the subsidiary power supply 50 to the main battery 101, by appropriately setting the duty ratio of the second voltage-boosting switching element 44. The first voltage-boosting switching element 43 is maintained in the off state.

Subsequently, in step S62, the power supply control portion 62 reads the subsidiary power supply current isub (the value of the electric current that flows in a direction from the subsidiary power supply 50 to the main battery 101) measured by the subsidiary power supply current sensor 52. In step S63, it is determined whether the subsidiary power supply current isub is equal to or smaller than a discharge stop determination current isubend. For example, the discharge stop determination current isubend is set to 0 ampere.

When the subsidiary power supply current isub is larger than the discharge stop determination current isubend, the processes in steps S61 to S63 are repeated. During this period, the electric charge continues to be discharged from the subsidiary power supply 50 to the main battery 101. When the subsidiary power supply current isub is equal to or smaller than the discharge stop determination current isubend (for example, the discharge current stops flowing), the second voltage-boosting switching element 44 is turned off in step S64, and the end-time discharge control routine ends.

Accordingly, by executing the end-time discharging control routine, the lifetime of the subsidiary power supply 50 is increased. Also, after the ignition switch 106 is turned on, it is possible to accurately detect the actual charge amount. That is, the actual charge amount is calculated by accumulating the values of the charge/discharge current that flows to/from the subsidiary power supply 50, and it is difficult to estimate the initial value of the amount of charge at the start time. Thus, the actual charge amount detection routine is executed after the electric charge is discharged from the subsidiary power supply 50. This suppresses a detection error due to variation in the initial value of the amount of charge. The voltage-boosting circuit 40 is also used to control the value of the discharge current that flows to the main battery 101. Therefore, a specific circuit used to control the discharge current does not need to be provided. Therefore, it is possible to suppress an increase in the cost.

With the electric power steering apparatus that includes the power supply apparatus according to the embodiment, it is possible to obtain the following effects.

1. As the deceleration "a" increases, the target charge amount J* and the upper limit charge current isubmax for the subsidiary power supply 50 increase. Therefore, the alternator 102 uses excess kinetic energy to generate electric power, and the subsidiary power supply 50 is efficiently charged.

2. As the vehicle speed Vx increases, the target charge amount J* is set to decrease according to the electric power required to assist the steering operation. Therefore, the subsidiary power supply 50 is not excessively charged. This increases the lifetime of the subsidiary power supply 50. In this case as well, when the vehicle is decelerating, the amount of charge in the subsidiary power supply 50 is quickly increased. Then, when the steering operation is performed while the vehicle travels at a low speed or the vehicle is stopped, it is possible to supply the sufficient electric power to the motor drive circuit 30.

3. Even when the target charge amount J* is increased while the vehicle is decelerating, the target charge amount J* is limited to a value equal to or smaller than the upper limit charge amount J*max. Therefore, it is possible to prevent the subsidiary power supply 50 from being overcharged, and to suppress an adverse effect on the durability of the subsidiary power supply 50.

4. The upper limit value of the charge current that flows to the subsidiary power supply 50 is set. Therefore, it is possible to prevent the electric current from excessively flowing out from the main battery 101 of the main power supply 100. Thus, it is possible to suppress deterioration of the main battery 101 and the subsidiary power supply 50, and accordingly to protect the entire power supply apparatus.

5. The supply of the electric power from the subsidiary power supply 50 is stopped as long as the electric power consumed in the motor drive circuit 30 does not exceed the upper limit of the electric power that can be output from the voltage-boosting circuit 40. Only when the electric power consumed in the motor drive circuit 30 exceeds the upper limit of the electric power that can be output from the voltage-boosting circuit 40, the electric power is supplied from the subsidiary power supply 50 to compensate for the shortage of the electric power. Therefore, it is possible to minimize the use of the electric power in the subsidiary power supply 50. Thus, the electric power is stored in the subsidiary power supply 50 so that the electric power in the subsidiary power supply 50 is used when large electric power is consumed. Accordingly, it is possible to appropriately execute the steering assist control.

6. When the actual charge amount Jx in the subsidiary power supply 50 is compared with the target charge amount J*, a dead zone is set. Therefore, it is possible to suppress a hunting phenomenon in which charging and discharging are frequently repeated. This further increases the lifetime of the subsidiary power supply 50.

7. As the power supply apparatus for the electric power steering apparatus, the main power supply 100 and the subsidiary power supply 50 are used to provide the sufficient steering assist performance. Therefore, it is possible to suppress an increase in the capacity of the main power supply 100.

8. The electric motor 20 is efficiently driven using the voltage-boosting circuit 40. The voltage-boosting circuit 40 is also used to control the charging/discharging of the subsidiary power supply 50. Therefore, the configuration of the circuit is not complicated, and an increase in the cost is suppressed. For example, a switching circuit or a switch used to switch between charging and discharging is not required.

9. Even if the boosted voltage of the voltage-boosting circuit 40 fluctuates due to the charging/discharging control for the subsidiary power supply 50, it is possible to appropriately control the operation of the electric motor 20, because the assist control portion 61 executes the PWM control for the motor drive circuit 30.

The electric power steering apparatus that includes the power supply apparatus according to the embodiment of the invention has been described. However, the invention is not limited to the above-described embodiment. Various modifications may be made without departing from the scope of the invention.

For example, the configuration that detects the decelerating state of the vehicle based on the amount of change in the vehicle speed Vx detected by the vehicle-speed sensor 23 is employed as the decelerating-state detection portion in the embodiment. However, a pressure sensor that detects a pressure in a brake hydraulic pressure circuit may be used to detect the decelerating state of the vehicle based on the hydraulic pressure. For example, a pressure sensor that detects a brake hydraulic pressure in a wheel cylinder or a master cylinder may be used, and it may be determined that the vehicle is decelerating when the detected pressure is higher than a predetermined value. Also, the deceleration "a" may be estimated based on the brake hydraulic pressure, and the deceleration "a" that increases as the brake hydraulic pressure increases may be detected. In this case, the axis of abscissas in FIG. 7 may indicate the brake hydraulic pressure. Also, a pressure in a brake booster may be detected, and it may be determined whether the vehicle is decelerating based on the pressure in the brake booster, or the deceleration "a" may be detected based on the pressure in the brake booster. It may be determined whether the vehicle is decelerating based on whether the brake pedal is depressed. The deceleration "a" may be estimated based on the brake pedal force.

A longitudinal acceleration sensor, which detects the longitudinal acceleration of the vehicle, may be provided, and the decelerating state of the vehicle may be detected based on the longitudinal acceleration detected by the longitudinal acceleration sensor (i.e., it may be determined whether the vehicle is decelerating based on the longitudinal acceleration, or the deceleration "a" may be detected based on the longitudinal acceleration).

Figure 11:
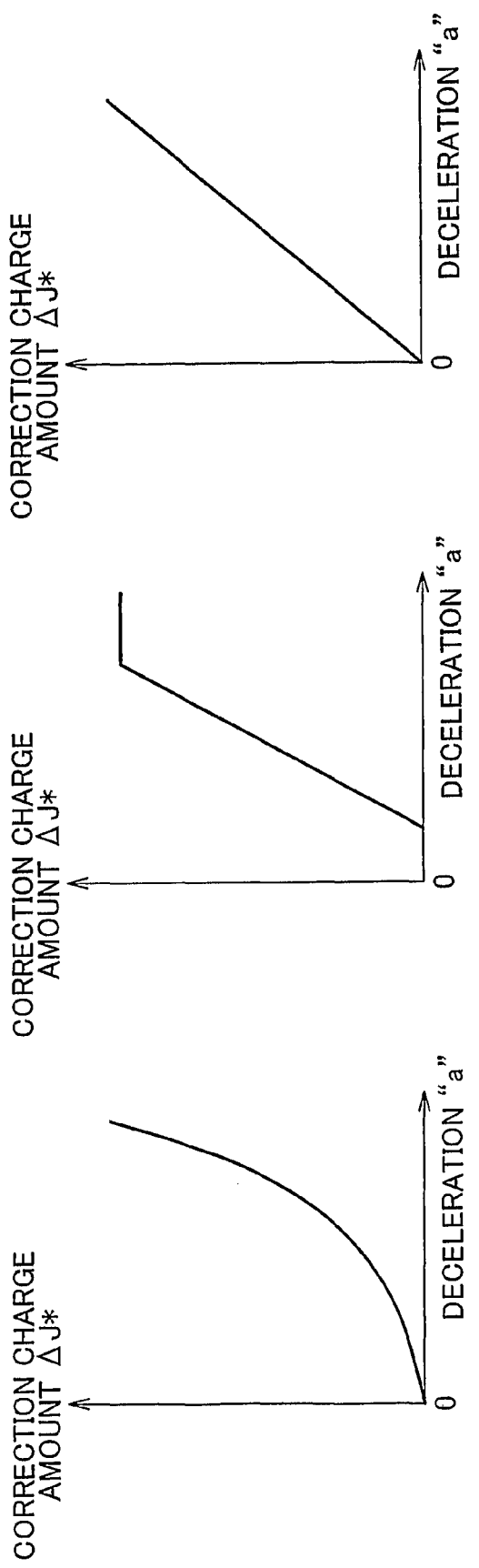
FIG. 11A to FIG. 11C are graphs showing correction charge amount setting tables according to modified examples of the invention.

Also, in the embodiment, the amount by which the target charge amount J* is changed (i.e., the correction charge amount ΔJ*) is set according to the deceleration "a", as shown in FIG. 7. However, for example, the correction charge amount ΔJ* may be set according to the deceleration "a", as shown in FIG. 11A to FIG. 11C. FIG. 11A shows the case where the correction charge amount ΔJ* is changed in a non-linear manner. FIG. 11B shows the case where the upper limit of the correction charge amount ΔJ* is set. In this case, it is possible to suppress overcharging with respect to the appropriate amount of charge that is set according to the vehicle speed Vx. FIG. 11C shows the case where a dead zone is not set.

Figure 12:
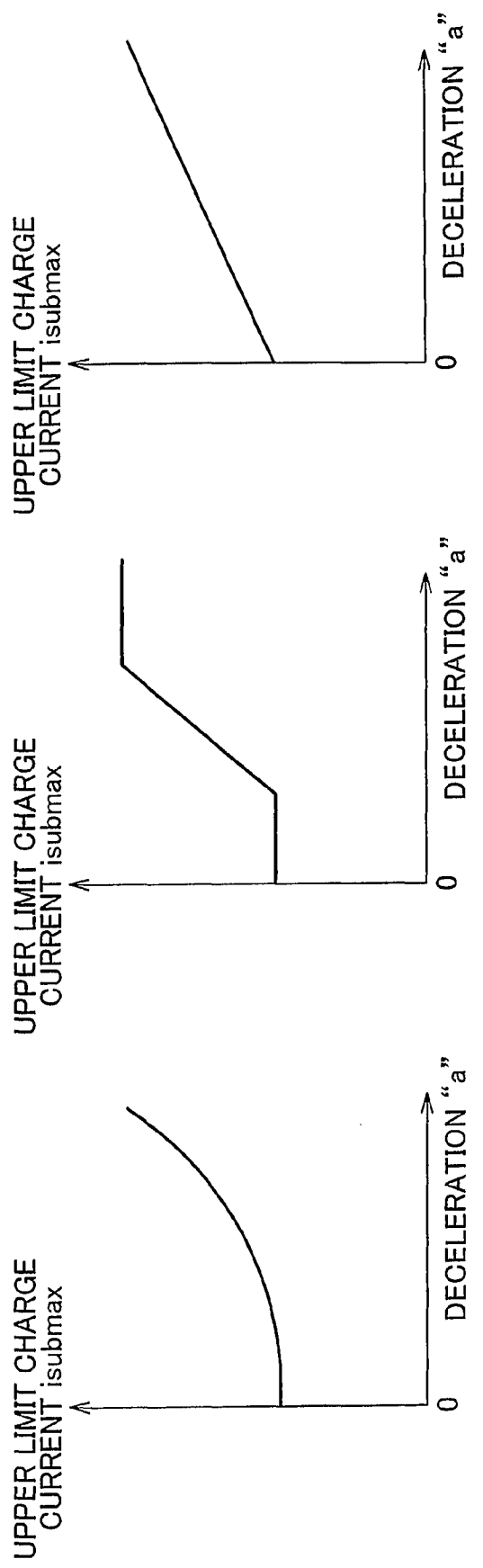
FIG. 12A to FIG. 12C are graphs showing upper limit charge current setting tables according to modified examples of the invention.

In the embodiment, the upper limit charge current isubmax is set according to the deceleration "a", as shown in FIG. 8. However, for example, the upper limit charge current isubmax may be set according to the deceleration "a", as shown in 12A to 12C. FIG. 12A shows the case where the upper limit charge current isubmax is changed in a non-linear manner. FIG. 12B shows the case where the upper limit of the upper limit charge current isubmax is set. In this case, it is possible to prevent the electric current from excessively flowing out from the main battery 101 when the deceleration "a" is large. This makes is possible to more reliably protect the main battery 101 and the subsidiary power supply 50. FIG. 12C shows the case where a dead zone is not set.

Also, in the embodiment, the target charge amount J* and the upper limit charge current isubmax are set to increase as the deceleration "a" increases. However, the target charge amount J* and the upper limit charge current isubmax may be set based on whether the vehicle is decelerating. That is, when it is determined that the vehicle is decelerating, the target charge amount J* and the upper limit charge current isubmax may be set to be larger than those when it is determined that the vehicle is not decelerating. Also, both of the target charge amount J* and the upper limit charge current isubmax need not necessarily be changed based on the decelerating state of the vehicle. Only one of the target charge amount J* and the upper limit charge current isubmax may be changed.

Figure 13:
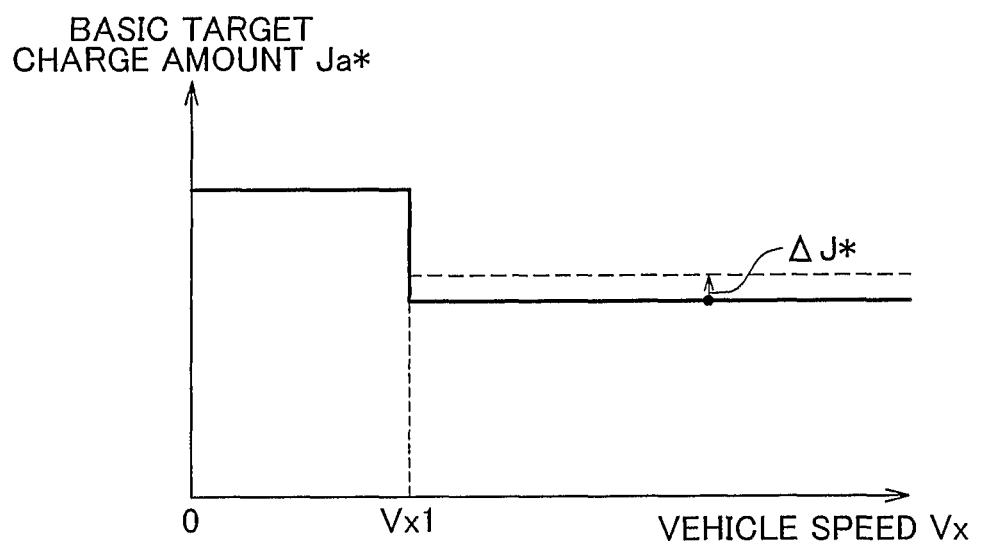
FIG. 13 is a graph showing a basic target charge amount setting table according to a modified example of the invention.

Also, in the embodiment, the target charge amount J* (the basic target charge amount Ja* in FIG. 6) is controlled to be decrease as the vehicle speed Vx increases. For example, as shown in FIG. 13, the target charge amount J* (the basic target charge amount Ja* in the example) may be switched between two levels, based on whether the vehicle speed Vx is higher than a reference vehicle speed Vx1. Also, the target charge amount J* (the basic target charge amount Ja*) may be switched between three levels. Also, the configuration may be made such that the target charge amount is not changed according to the vehicle speed.

Also, in the embodiment, each of the basic assist torque Tas, the basic target charge amount Ja*, the correction charge amount ΔJ*, and the upper limit charge current isubmax is calculated using the reference table. However, each of the basic assist torque Tas, the basic target charge amount Ja*, the correction charge amount ΔJ*, and the upper limit charge current isubmax may be calculated using other information on the relation, for example, a function.

Also, the power supply apparatus need not necessarily be applied to the electric power steering apparatus. The power supply apparatus may be applied to various apparatuses. For example, the power supply apparatus may be applied to various vehicle control systems including electric actuators, as apparatuses provided in the vehicle. For example, the power supply apparatus may be applied to an electrically-controlled brake apparatus, an electrically-controlled suspension apparatus, and an electrically-controlled stabilizer apparatus. Also, the power supply apparatus may be applied to a steer-by-wire steering apparatus as the steering apparatus that provides a steering force to the wheels. The steer-by-wire steering apparatus mechanically separates the steering wheel from a wheel turning shaft, and turns the wheels using only a force provided from an electric motor that is operated according to the steering operation.

Also, in the embodiment, the amount of charge in the subsidiary power supply 50 is adjusted by controlling the boosted voltage of the voltage-boosting circuit 40. However, the voltage-boosting circuit 40 need not necessarily be used. For example, an input/output circuit that switches between charging and discharging of the subsidiary power supply 50 may be provided on the charge/discharge line 114, and the amount of charge in the subsidiary power supply 50 may be adjusted by controlling the input/output circuit using a microcomputer.

Also, in the embodiment, the electronic control unit 60 includes the power supply control portion 62 that constitutes a part of the power supply apparatus, and the assist control portion 61 that constitutes a part of the electric power steering apparatus. However, the control portions 61 and 62 may be constituted by the respective microcomputers.

The power supply control portion 62 that executes the charging/discharging control routine, and the voltage-boosting circuit 40 function as the charge amount control portion. Also, the vehicle-speed sensor 23 and the power supply control portion 62 that executes the processes in steps S320 and S322 in the target charge amount setting routine function as the decelerating-state detection portion. The power supply control portion 62 that executes the target charge amount setting routine functions as the target charge amount setting portion. The power supply control portion 62 that executes the process in step S44 in the charging/discharging control routine functions as the charge current limiting portion. Also, the power supply control portion 62 that executes the process in step S33 in the charging/discharging control routine functions as the upper limit current setting portion.

The invention claimed is:
1. A power supply apparatus for a vehicle, comprising:
 a main power supply that includes a power generator driven by an engine to generate electric power, and a battery, wherein the power generator and the battery are connected in parallel to each other;

a subsidiary power supply that is connected in parallel to a circuit that connects the main power supply to a specific electric load, wherein the subsidiary power supply is charged with the electric power output from the main power supply, and the subsidiary power supply assists supply of the electric power to the specific electric load using the electric power with which the subsidiary power supply is charged;

a charge current limiting portion that limits a charge current that flows to the subsidiary power supply to a value equal to or smaller than an upper limit value;

a decelerating-state detection portion that detects a decelerating state of a vehicle; and an upper limit current setting portion that sets the upper limit value based on the decelerating state of the vehicle detected by the decelerating-state detection portion so that when the vehicle is decelerating, the upper limit value is larger than the upper limit value when the vehicle is not decelerating.

2. The power supply apparatus according to claim 1, further comprising a voltage-boosting circuit that boosts an output voltage of the main power supply, wherein:
a power supply circuit that supplies the electric power from the voltage-boosting circuit to the specific electric load is formed, and the subsidiary power supply is connected in parallel to the power supply circuit; and the charge current limiting portion limits the charge current that flows to the subsidiary power supply by controlling a boosted voltage of the voltage-boosting circuit.

3. The power supply apparatus according to claim 2, wherein when the power supply apparatus is stopped, an electric charge in the subsidiary power supply is discharged to the main power supply.

4. A method of controlling a power supply apparatus for a vehicle, the power supply apparatus including a main power supply that includes a power generator driven by an engine to generate electric power, and a battery, wherein the power generator and the battery are connected in parallel to each other; and a subsidiary power supply that is connected in parallel to a circuit that connects the main power supply to a specific electric load, wherein the subsidiary power supply is charged with the electric power output from the main power supply, and the subsidiary power supply assists supply of the electric power to the specific electric load using the electric power with which the subsidiary power supply is charged; the method comprising:

controlling charging of the subsidiary power supply so that an amount of charge in the subsidiary power supply is equal to a target amount of charge;

detecting a decelerating state of a vehicle; and setting the target amount of charge based on the detected decelerating state of the vehicle so that when the vehicle is decelerating, the target amount of charge is larger than the target amount of charge when the vehicle is not decelerating.

5. The power supply apparatus according to claim 1, wherein when the power supply apparatus is stopped, an electric charge in the subsidiary power supply is discharged to the main power supply.

* * * * *